United States Patent
Tabata et al.

(10) Patent No.: US 7,587,270 B2
(45) Date of Patent: Sep. 8, 2009

(54) INTERNAL COMBUSTION ENGINE SYSTEM AND INTERNAL COMBUSTION ENGINE CONTROL METHOD

(75) Inventors: Mitsuhiro Tabata, Suntou-gun (JP); Makoto Nakamura, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 344 days.

(21) Appl. No.: 11/663,295

(22) PCT Filed: Oct. 17, 2005

(86) PCT No.: PCT/JP2005/019435

§ 371 (c)(1), (2), (4) Date: Mar. 20, 2007

(87) PCT Pub. No.: WO2006/043679

PCT Pub. Date: Apr. 27, 2006

(65) Prior Publication Data

US 2008/0091328 A1  Apr. 17, 2008

(30) Foreign Application Priority Data

Oct. 22, 2004  (JP) .............................. 2004-308338

(51) Int. Cl.
*G06F 19/00* (2006.01)
*F02N 17/00* (2006.01)
*F02D 41/06* (2006.01)
*F02D 45/00* (2006.01)

(52) U.S. Cl. ..................... 701/112; 701/113; 123/179.4

(58) Field of Classification Search ......... 701/101–105, 701/110, 112, 113, 115; 123/179.3–179.5, 123/179.16, 179.18, 491, 493, 198 DB, 198 DC, 123/198 D See application file for complete search history.

(56) References Cited

U.S. PATENT DOCUMENTS 7,269,499 B2 * 9/2007 Murakami et al. .......... 701/112

(Continued)

FOREIGN PATENT DOCUMENTS

DE 195 27 503 A1 1/1997

(Continued)

*Primary Examiner*—Willis R Wolfe, Jr.
(74) *Attorney, Agent, or Firm*—Oliff & Berridge, PLC

(57) ABSTRACT

The internal combustion engine control technique of the invention computes a TDC pass rotation speed Ntdc, which represents the rotation speed of an engine when one of multiple cylinders of the engine passes over a top dead center TDC (step S110). The control technique estimates an engine stop crank angle CAs from a map that is experimentally or otherwise obtained to represent a variation in TDC pass rotation speed Ntdc against the stop position of the engine (step S120), and specifies a fuel injection cylinder that stops in a preset cycle range including part of a compression stroke at a stop of the engine (step S130). The specified fuel injection cylinder receives lean fuel injection at a specific fuel injection timing (step S170). When the specified fuel injection cylinder is later presumed not to pass over a top dead center TDC of the compression stroke, a corrected amount of fuel is injected into the specified fuel injection cylinder (step S240). When the specified fuel injection cylinder is later presumed to pass over the top dead center TDC of the compression stroke, on the other hand, the control technique ignites an air-fuel mixture of the intake air and the injected fuel for combustion in the compression stroke, synchronously with fuel injection into a next cylinder that goes into the compression stroke after the specified fuel injection cylinder (step S270).

50 Claims, 6 Drawing Sheets

U.S. PATENT DOCUMENTS

2004/0149251 A1    8/2004    Nishikawa et al.
2004/0216719 A1    11/2004   Condemine et al.
2008/0103683 A1*   5/2008    Tabata et al. ................ 701/112

FOREIGN PATENT DOCUMENTS

| | | |
|---|---|---|
| EP | 1 477 654 A1 | 11/2004 |
| JP | A 60-88832 | 5/1985 |
| JP | A 62-255558 | 11/1987 |
| JP | A 4-153558 | 5/1992 |
| JP | 11107823 A * | 4/1999 ................ 701/112 |
| JP | 2000307830 A * | 11/2000 ................ 701/112 |
| JP | 2001 152891 | 6/2001 |
| JP | A 2001-342876 | 12/2001 |
| JP | A-2004-204746 | 7/2004 |
| JP | A 2004-204747 | 7/2004 |
| JP | A-2004-245105 | 9/2004 |
| JP | A-2004-245116 | 9/2004 |
| JP | A 2004-263569 | 9/2004 |
| WO | WO 03/012273 A2 | 2/2003 |

\* cited by examiner

INTERNAL COMBUSTION ENGINE SYSTEM AND INTERNAL COMBUSTION ENGINE CONTROL METHOD

TECHNICAL FIELD

The present invention relates to an internal combustion engine system, an internal combustion engine control method, and a stop position prediction method that predicts a stop position of an internal combustion engine.

BACKGROUND ART

A proposed internal combustion engine system enables ignition of an air-fuel mixture for combustion in a cylinder having a first ignition timing at an auto restart of an internal combustion engine after its auto stop (see, for example, Japanese Patent Laid-Open Gazette No. 2001-342876). The ignition and combustion of the air-fuel mixture in the cylinder having the first ignition timing achieves a quick restart of the internal combustion engine.

DISCLOSURE OF THE INVENTION

In an internal combustion engine where a supply of fuel is individually injected into respective intake systems of multiple cylinders, for example, four cylinders or six cylinders, the fuel injection is generally performed in a final phase of an exhaust stroke. The ignition and combustion of the air-fuel mixture in the cylinder having the first ignition timing accordingly requires fuel injection in the final phase of the exhaust stroke immediately before a stop of the internal combustion engine into the cylinder that stops in a certain range from an intake stroke to a compression stroke at the stop of the internal combustion engine. An adequate degree of compression in the cylinder is also required for the ignition and combustion of the air-fuel mixture in the cylinder. Fuel injection is thus to be performed in the cylinder that stops in an adequate range from the intake stroke to the compression stroke. Accurate prediction of the stop position of the internal combustion engine is essential for this purpose.

At the stop of the internal combustion engine, the throttle valve is generally set in the closed position. The supply of fuel injected immediately before the stop of the internal combustion engine accordingly receives only a little amount of intake air. In a port injection-type internal combustion engine, this may lead to insufficient diffusion of the injected fuel.

The varying conditions and the aged deterioration of the internal combustion engine may cause the unstable stop position of the internal combustion engine. The cylinder receiving the fuel injection immediately before the stop of the internal combustion engine may thus pass over the adequate range to reach a top dead center of the compression stroke. In such cases, the cylinder receiving the fuel injection is different from the cylinder having the first ignition timing at a restart of the internal combustion engine. When the cylinder receiving the fuel injection approaches to the top dead center of the compression stroke, a compression-induced temperature rise may cause spontaneous ignition and combustion of the air-fuel mixture and lead to undesirable vibrations due to the unexpected combustion. This makes the driver feel something is wrong in an automobile equipped with the internal combustion engine.

The internal combustion engine system of the invention and the corresponding stop position prediction method of the invention aim to predict the stop position of the internal combustion engine with high accuracy. The internal combustion engine system of the invention and the corresponding internal combustion engine control method aim to give fuel injection in a cylinder having a first ignition timing at a start of the internal combustion engine and thereby ensure a quick start of the internal combustion engine. The internal combustion engine system of the invention and the corresponding internal combustion engine control method also aim to enable sufficient diffusion of the fuel injected in a cylinder having a first ignition timing at a start of the internal combustion engine. The internal combustion engine system of the invention and the corresponding internal combustion engine control method further aim to ensure an adequate amount of fuel injection into a cylinder having a first ignition timing at a start of the internal combustion engine with a high probability. The internal combustion engine system of the invention and the corresponding internal combustion engine control method also aim to prevent spontaneous ignition in a cylinder that has received fuel injection immediately before a stop of the internal combustion engine.

At least part of the above and the other related objects is attained by an internal combustion engine system, an internal combustion engine control method, and a stop position prediction method of the invention having the configurations discussed below.

The present invention is directed to a first internal combustion engine system including an internal combustion engine. The internal combustion engine system includes: a rotation speed measurement unit that measures rotation speed of the internal combustion engine; and a stop position prediction module that predicts a stop position of the internal combustion engine, based on the rotation speed of the internal combustion engine measured by the rotation speed measurement unit when one of multiple cylinders of the internal combustion engine passes over a top dead center during a decrease in rotation speed of the internal combustion engine under prohibition of fuel injection into the internal combustion engine.

The first internal combustion engine system of the invention predicts the stop position of the internal combustion engine, based on the measured rotation speed of the internal combustion engine when one of the multiple cylinders of the internal combustion engine passes over the top dead center during a decrease in rotation speed of the internal combustion engine under prohibition of fuel injection into the internal combustion engine. There is a relatively little variation in rotation speed of the internal combustion engine at the timing when one of the multiple cylinders of the internal combustion engine passes over the top dead center. The stop position of the internal combustion engine is predictable with high accuracy, based on the rotation speed of the internal combustion engine having a relatively little variation.

In the first internal combustion engine system of the invention, it is preferable that the stop position prediction module predicts the stop position of the internal combustion engine, based on a record of the rotation speed of the internal combustion engine measured by the rotation speed measurement unit when one of the multiple cylinders of the internal combustion engine passes over the top dead center. This arrangement predicts the stop position of the internal combustion engine, based on the at least two measured rotation speeds when one of the multiple cylinders of the internal combustion engine passes over the top dead center. The stop position of the internal combustion engine is thus predictable with high accuracy.

In one preferable application of the invention, the internal combustion engine system further includes: an air intake regulation unit that regulates an amount of intake air into the internal combustion engine; a fuel injection unit that is capable of individually injecting a supply of fuel into the multiple cylinders of the internal combustion engine; an ignition unit that is capable of individually igniting an air-fuel mixture of the intake air and the injected fuel in the multiple cylinders of the internal combustion engine; a crank angle measurement unit that measures a crank angle of the internal combustion engine; a stop control module that, in response to a stop instruction of the internal combustion engine, controls the fuel injection unit according to the measured crank angle to inject the fuel at a specific fuel injection timing immediately before a stop of the internal combustion engine into a specified cylinder, which stops in a preset cycle range including part of a compression stroke when the internal combustion engine stops at the stop position predicted by the stop position prediction module; and a start control module that, in response to a start instruction of the internal combustion engine, controls the fuel injection unit and the ignition unit according to the measured crank angle to ignite the air-fuel mixture at a first ignition timing in the specified cylinder, which stops in the preset cycle range, and to start the internal combustion engine. This arrangement enables accurate specification of the cylinder that stops in the preset cycle range including part of the compression stroke at a stop of the internal combustion engine and resulting adequate fuel injection into the specified cylinder, thus ensuring a quick start of the internal combustion engine. In the first internal combustion engine system of this application, the fuel injection unit may individually inject the supply of fuel into respective intake systems of the multiple cylinders of the internal combustion engine. The stop control module may control the fuel injection unit according to the measured crank angle to inject the fuel into the specified cylinder, which stops in the preset cycle range, in an intake stroke of the specified cylinder immediately before the stop of the internal combustion engine.

In one preferable embodiment of the first internal combustion engine system of the invention including the stop control module and the start control module, the stop control module controls the air intake regulation unit to increase the amount of intake air in the course of fuel injection at the specific fuel injection timing immediately before the stop of the internal combustion engine. The increased amount of intake air effectively diffuses the fuel injected into the specified cylinder stopping in the preset cycle range and enables sufficient combustion for a restart of the internal combustion engine. This ensures a quick start of the internal combustion engine.

In another preferable embodiment of the first internal combustion engine system of the invention including the stop control module and the start control module, the stop control module controls the fuel injection unit according to the measured crank angle to inject another supply of the fuel before the stop of the internal combustion engine into the specified cylinder, which has received the fuel injection at the specific fuel injection timing. This arrangement enables the required amount of the fuel to be injected in two or more parts, thus ensuring an adequate amount of fuel injection.

In the first internal combustion engine system of the invention that injects another supply of the fuel before the stop of the internal combustion engine into the specified cylinder receiving the fuel injection at the specific fuel injection timing, the stop control module may control the fuel injection unit according to the measured crank angle to inject a first amount of the fuel, which is less than a specific amount of the fuel to achieve a stoichiometric air-fuel ratio, into the specified cylinder stopping in the preset cycle range at the specific fuel injection timing immediately before the stop of the internal combustion engine, and to inject a corrected second amount of the fuel in the specified cylinder before the stop of the internal combustion engine. The first internal combustion engine system of this arrangement injects the first amount of the fuel at the specific fuel injection timing into the specified cylinder stopping in the preset, cycle range to make the air-fuel mixture of a lean air-fuel ratio, and injects another supply of the fuel to make the air-fuel mixture of an adequate air-fuel ratio for effective combustion. The first amount of the fuel may be determined to be not less than a minimum amount of the fuel as a combustible lean limit. The second amount of the fuel may be determined, such that a sum of the first amount and the second amount of the fuel achieves an air-fuel ratio sufficiently close to the stoichiometric air-fuel ratio. In one preferable embodiment of the first internal combustion engine system of this arrangement, when the stop position of the internal combustion engine, which is predicted by the stop position prediction module after the fuel injection at the specific fuel injection timing into the specified cylinder stopping in the preset cycle range, leads to determination that a stop position of the specified cylinder receiving the fuel injection does not pass over a reinjection-inducing stop position, the stop control module controls the fuel injection unit to inject the second amount of the fuel in an intake stroke of the specified cylinder. Such control desirably prevents pointless fuel injection into the specified cylinder that passes over the reinjection-inducing stop position. The reinjection-inducing stop position may be defined by a preset crank angle that causes a compression temperature in the specified cylinder receiving the fuel injection to rise to a temperature level with a potential for spontaneous ignition of the air-fuel mixture, The reinjection-inducing stop position may otherwise represent a top dead center in a compression stroke of the specified cylinder receiving the fuel injection.

In still another preferable embodiment of the first internal combustion engine system of the invention including the stop control module and the start control module, when the stop position of the internal combustion engine, which is predicted by the stop position prediction module after the fuel injection at the specific fuel injection timing into the specified cylinder stopping in the preset cycle range, leads to determination that a stop position of the specified cylinder receiving the fuel injection passes over an ignition-inducing stop position, the stop control module controls the ignition unit to ignite the air-fuel mixture in the specified cylinder before the stop position of the specified cylinder passes over the ignition-inducing stop position. This arrangement desirably retains unexpected combustion of the air-fuel mixture caused by, for example, spontaneous ignition in the specified cylinder receiving the fuel injection, thus effectively preventing potential vibrations due to the unexpected combustion.

In the first internal combustion engine system of the invention that ignites the air-fuel mixture in the specified cylinder receiving the fuel injection before the stop position of the specified cylinder passes over the ignition-inducing stop position, it is preferable that, in response to the determination that the stop position of the specified cylinder receiving the fuel injection passes over the ignition-inducing stop position, the stop control module controls the ignition unit to ignite the air-fuel mixture in a compression stroke of the specified cylinder. This arrangement ensures combustion of the air-fuel mixture prior to a rise of compression pressure, thus effectively preventing undesirable vibrations due to the combustion. The ignition-inducing stop position may represent a top dead center in a compression stroke of the specified cylinder receiving the fuel injection.

In the first internal combustion engine system of the invention that ignites the air-fuel mixture in the specified cylinder receiving the fuel injection before the stop position of the specified cylinder passes over the ignition-inducing stop position, it is also preferable that, in response to the determination that the stop position of the specified cylinder receiving the fuel injection passes over the ignition-inducing stop position, the stop control module controls the fuel injection unit to inject the fuel in an intake stroke of a next cylinder, which goes into a compression stroke after the specified cylinder, and the start control module controls the fuel injection unit and the ignition unit to ignite the air-fuel mixture at a first ignition timing in the next cylinder and to start the internal combustion engine. This arrangement enables the air-fuel mixture to be ignited at the first ignition timing in the next cylinder, thus ensuring a quick start of the internal combustion engine.

The present invention is also directed to a second internal combustion engine system including an internal combustion engine. The second internal combustion engine system includes: an air intake regulation unit that regulates an amount of intake air into the internal combustion engine; a fuel injection unit that is capable of individually injecting a supply of fuel into respective intake systems of multiple cylinders of the internal combustion engine; an ignition unit that is capable of individually igniting an air-fuel mixture of the intake air and the injected fuel in the multiple cylinders of the internal combustion engine; a stop position prediction module that predicts a stop position of the internal combustion engine; a crank angle measurement unit that measures a crank angle of the internal combustion engine; a stop control module that, in response to a stop instruction of the internal combustion engine, controls the fuel injection unit and the air intake regulation unit according to the measured crank angle to inject the fuel at a specific fuel injection timing immediately before a stop of the internal combustion engine into a specified cylinder, which stops in a preset cycle range including part of a compression stroke when the internal combustion engine stops at the stop position predicted by said stop position prediction module and to increase the amount of intake air in the course of fuel injection at the specific fuel injection timing; and a start control module that, in response to a start instruction of the internal combustion engine, controls the fuel injection unit and the ignition unit according to the measured crank angle to ignite the air-fuel mixture at a first ignition timing in the specified cylinder, which stops in the preset cycle range, and to start the internal combustion engine.

In response to a stop instruction of the internal combustion engine, the second internal combustion engine system of the invention injects the fuel according to the measured crank angle at the specific fuel injection timing immediately before a stop of the internal combustion engine into the specified cylinder, which stops in the preset cycle range including part of the compression stroke when the internal combustion engine stops at the predicted stop position. The amount of intake air is increased in the course of fuel injection at the specific fuel injection timing. In response to a start instruction of the internal combustion engine, the second internal combustion engine system of the invention ignites the air-fuel mixture at the first ignition timing in the specified cylinder, which stops in the preset cycle range, based on the measured crank angle, and accordingly starts the internal combustion engine. The increased amount of intake air during fuel injection effectively diffuses the fuel injected into the specified cylinder stopping in the preset cycle range and enables sufficient combustion for a restart of the internal combustion engine. This ensures a quick start of the internal combustion engine.

Also, in the second internal combustion engine system of the invention, the stop control module may control the fuel injection unit according to the measured crank angle to inject another supply of the fuel before the stop of the internal combustion engine into the specified cylinder, which has received the fuel injection at the specific fuel injection timing. This arrangement enables the required amount of the fuel to be injected in two or more parts, thus ensuring an adequate amount of fuel injection.

In the second internal combustion engine system of the invention that injects another supply of the fuel before the stop of the internal combustion engine into the specified cylinder receiving the fuel injection at the specific fuel injection timing, the stop control module may control the fuel injection unit according to the measured crank angle to inject a first amount of the fuel, which is less than a specific amount of the fuel to achieve a stoichiometric air-fuel ratio, into the specified cylinder stopping in the preset cycle range at the specific fuel injection timing immediately before the stop of the internal combustion engine, and to inject a corrected second amount of the fuel in the specified cylinder before the stop of the internal combustion engine. The second internal combustion engine system of this arrangement injects the first amount of the fuel at the specific fuel injection timing into the specified cylinder stopping in the preset cycle range to make the air-fuel mixture of a lean air-fuel ratio, and injects another supply of the fuel to make the air-fuel mixture of an adequate air-fuel ratio for effective combustion. The first amount of the fuel may be determined to be not less than a minimum amount of the fuel as a combustible lean limit. The second amount of the fuel may be determined, such that a sum of the first amount and the second amount of the fuel achieves an air-fuel ratio sufficiently close to the stoichiometric air-fuel ratio. In one preferable embodiment of the second internal combustion engine system of this arrangement, when the stop position of the internal combustion engine, which is predicted by the stop position prediction module after the fuel injection at the specific fuel injection timing into the specified cylinder stopping in the preset cycle range, leads to determination that a stop position of the specified cylinder receiving the fuel injection does not pass over a reinjection-inducing stop position, the stop control module controls the fuel injection unit to inject the second amount of the fuel in an intake stroke of the specified cylinder. Such control desirably prevents pointless fuel injection into the specified cylinder that passes over the reinjection-inducing stop position. The reinjection-inducing stop position may be defined by a preset crank angle that causes a compression temperature in the specified cylinder receiving the fuel injection to rise to a temperature level with a potential for spontaneous ignition of the air-fuel mixture. The reinjection-inducing stop position may otherwise represent a top dead center in a compression stroke of the specified cylinder receiving the fuel injection.

In still another preferable embodiment of the second internal combustion engine system of the invention, when the stop position of the internal combustion engine, which is predicted by the stop position prediction module after the fuel injection at the specific fuel injection timing into the specified cylinder stopping in the preset cycle range, leads to determination that a stop position of the specified cylinder receiving the fuel injection passes over an ignition-inducing stop position, the stop control module controls the ignition unit to ignite the air-fuel mixture in the specified cylinder before the stop position of the specified cylinder passes over the ignition-inducing stop position. This arrangement desirably retains unexpected combustion of the air-fuel mixture caused by, for example, spontaneous ignition in the specified cylinder receiving the fuel injection, thus effectively preventing potential vibrations due to the unexpected combustion.

In the second internal combustion engine system of the invention that ignites the air-fuel mixture in the specified cylinder receiving the fuel injection before the stop position of the specified cylinder passes over the ignition-inducing stop position, it is preferable that, in response to the determination that the stop position of the specified cylinder receiving the fuel injection passes over the ignition-inducing stop position, the stop control module controls the ignition unit to ignite the air-fuel mixture in a compression stroke of the specified cylinder. This arrangement ensures combustion of the air-fuel mixture prior to a rise of compression pressure, thus effectively preventing undesirable vibrations due to the combustion. The ignition-inducing stop position may represent a top dead center in a compression stroke of the specified cylinder receiving the fuel injection.

In the second internal combustion engine system of the invention that ignites the air-fuel mixture in the specified cylinder receiving the fuel injection before the stop position of the specified cylinder passes over the ignition-inducing stop position, it is also preferable that, in response to the determination that the stop position of the specified cylinder receiving the fuel injection passes over the ignition-inducing stop position, the stop control module controls the fuel injection unit to inject the fuel in an intake stroke of a next cylinder, which goes into a compression stroke after the specified cylinder, and the start control module controls the fuel injection unit and the ignition unit to ignite the air-fuel mixture at a first ignition timing in the next cylinder and to start the internal combustion engine. This arrangement enables the air-fuel mixture to be ignited at the first ignition timing in the next cylinder, thus ensuring a quick start of the internal combustion engine.

The present invention is also directed to a third internal combustion engine system including an internal combustion engine. The third internal combustion engine system includes: an air intake regulation unit that regulates an amount of intake air into the internal combustion engine; a fuel injection unit that is capable of individually injecting a supply of fuel into multiple cylinders of the internal combustion engine; an ignition unit that is capable of individually igniting an air-fuel mixture of the intake air and the injected fuel in the multiple cylinders of the internal combustion engine; a stop position prediction module that predicts a stop position of the internal combustion engine; a crank angle measurement unit that measures a crank angle of the internal combustion engine; a stop control module that, in response to a stop instruction of the internal combustion engine, controls the fuel injection unit according to the measured crank angle to inject the fuel at a specific fuel injection timing immediately before a stop of the internal combustion engine into a specified cylinder, which stops in a preset cycle range including part of a compression stroke when the internal combustion engine stops at the stop position predicted by said stop position prediction module and to inject another supply of the fuel before the stop of the internal combustion engine into the specified cylinder, which has received the fuel injection at the specific fuel injection timing; and a start control module that, in response to a start instruction of the internal combustion engine, controls the fuel injection unit and the ignition unit according to the measured crank angle to ignite the air-fuel mixture at a first ignition timing in the specified cylinder, which stops in the preset cycle range, and to start the internal combustion engine.

In response to a stop instruction of the internal combustion engine, the third internal combustion engine system of the invention injects the fuel according to the measured crank angle at the specific fuel injection timing immediately before a stop of the internal combustion engine into the specified cylinder, which stops in the preset cycle range including part of the compression stroke when the internal combustion engine stops at the predicted stop position. The third internal combustion engine system of the invention injects another supply of the fuel according to the measured crank angle before the stop of the internal combustion engine into the specified cylinder receiving the fuel injection. In response to a start instruction of the internal combustion engine, the third internal combustion engine system of the invention ignites the air-fuel mixture at the first ignition timing in the specified cylinder, which stops in the preset cycle range, based on the measured crank angle, and accordingly starts the internal combustion engine. Such control enables the required amount of the fuel to be injected in two or more parts in the specified cylinder stopping in the preset cycle range, thus ensuring adequate regulation of the amount of fuel injection. This enables sufficient combustion for a restart of the internal combustion engine and ensures a quick start of the internal combustion engine.

In one preferable embodiment of the third internal combustion engine system of the invention, the fuel injection unit individually injects the supply of fuel into respective intake systems of the multiple cylinders of the internal combustion engine. The stop control module controls the fuel injection unit according to the measured crank angle to inject another supply of the fuel in an intake stroke of the specified cylinder, which stops in the preset cycle range, immediately before the stop of the internal combustion engine.

In the third internal combustion engine system of the invention, the stop control module may control the fuel injection unit according to the measured crank angle to inject a first amount of the fuel, which is less than a specific amount of the fuel to achieve a stoichiometric air-fuel ratio, into the specified cylinder stopping in the preset cycle range at the specific fuel injection timing immediately before the stop of the internal combustion engine, and to inject a corrected second amount of the fuel in the specified cylinder before the stop of the internal combustion engine. The second internal combustion engine system of this arrangement injects the first amount of the fuel at the specific fuel injection timing into the specified cylinder stopping in the preset cycle range to make the air-fuel mixture of a lean air-fuel ratio, and injects another supply of the fuel to make the air-fuel mixture of an adequate air-fuel ratio for effective combustion. The first amount of the fuel may be determined to be not less than a minimum amount of the fuel as a combustible lean limit. The second amount of the fuel may be determined, such that a sum of the first amount and the second amount of the fuel achieves an air-fuel ratio sufficiently close to the stoichiometric air-fuel ratio. In one preferable embodiment of the second internal combustion engine system of this arrangement, when the stop position of the internal combustion engine, which is predicted by the stop position prediction module after the fuel injection at the specific fuel injection timing into the specified cylinder stopping in the preset cycle range, leads to determination that a stop position of the specified cylinder receiving the fuel injection does not pass over a reinjection-inducing stop position, the stop control module controls the fuel injection unit to inject the second amount of the fuel in an intake stroke of the specified cylinder. Such control desirably prevents pointless fuel injection into the specified cylinder that passes over the reinjection-inducing stop position. The reinjection-inducing stop position may be defined by a preset crank angle that causes a compression temperature in the specified cylinder receiving the fuel injection to rise to a temperature level with a potential for spontaneous ignition of the air-fuel mixture. The reinjection-inducing stop position may otherwise represent a top dead center in a compression stroke of the specified cylinder receiving the fuel injection.

In still another preferable embodiment of the third internal combustion engine system of the invention, when the stop position of the internal combustion engine, which is predicted by the stop position prediction module after the fuel injection at the specific fuel injection timing into the specified cylinder stopping in the preset cycle range, leads to determination that a stop position of the specified cylinder receiving the fuel injection passes over an ignition-inducing stop position, the stop control module controls the ignition unit to ignite the air-fuel mixture in the specified cylinder before the stop position of the specified cylinder passes over the ignition-inducing stop position. This arrangement desirably retains unexpected combustion of the air-fuel mixture caused by, for example, spontaneous ignition in the specified cylinder receiving the fuel injection, thus effectively preventing potential vibrations due to the unexpected combustion.

In the third internal combustion engine system of the invention that ignites the air-fuel mixture in the specified cylinder receiving the fuel injection before the stop position of the specified cylinder passes over the ignition-inducing stop position, it is preferable that, in response to the determination that the stop position of the specified cylinder receiving the fuel injection passes over the ignition-inducing stop position, the stop control module controls the ignition unit to ignite the air-fuel mixture in a compression stroke of the specified cylinder. This arrangement ensures combustion of the air-fuel mixture prior to a rise of compression pressure, thus effectively preventing undesirable vibrations due to the combustion. The ignition-inducing stop position may represent a top dead center in a compression stroke of the specified cylinder receiving the fuel injection.

In the third internal combustion engine system of the invention that ignites the air-fuel mixture in the specified cylinder receiving the fuel injection before the stop position of the specified cylinder passes over the ignition-inducing stop position, it is also preferable that, in response to the determination that the stop position of the specified cylinder receiving the fuel injection passes over the ignition-inducing stop position, the stop control module controls the fuel injection unit to inject the fuel in an intake stroke of a next cylinder, which goes into a compression stroke after the specified cylinder, and the start control module controls the fuel injection unit and the ignition unit to ignite the air-fuel mixture at a first ignition timing in the next cylinder and to start the internal combustion engine. This arrangement enables the air-fuel mixture to be ignited at the first ignition timing in the next cylinder, thus ensuring a quick start of the internal combustion engine.

The present invention is also directed to a fourth internal combustion engine system including an internal combustion engine. The fourth internal combustion engine system includes: an air intake regulation unit that regulates an amount of intake air into the internal combustion engine; a fuel injection unit that is capable of individually injecting a supply of fuel into multiple cylinders of the internal combustion engine; an ignition unit that is capable of individually igniting an air-fuel mixture of the intake air and the injected fuel in the multiple cylinders of the internal combustion engine; a stop position prediction module that predicts a stop position of the internal combustion engine; a crank angle measurement unit that measures a crank angle of the internal combustion engine; a stop control module that, in response to a stop instruction of the internal combustion engine, controls the fuel injection unit according to the measured crank angle to inject the fuel at a specific fuel injection timing immediately before a stop of the internal combustion engine into a specified cylinder, which stops in a preset cycle range including part of a compression stroke when the internal combustion engine stops at the stop position predicted by said stop position prediction module, when the stop position of the internal combustion engine, which is predicted by said stop position prediction module after the fuel injection at the specific fuel injection timing into the specified cylinder stopping in the preset cycle range, leads to determination that a stop position of the specified cylinder receiving the fuel injection passes over an ignition-inducing stop position, said stop control module controlling the ignition unit to ignite the air-fuel mixture in the specified cylinder before the stop position of the specified cylinder passes over the ignition-inducing stop position; and a start control module that, in response to a start instruction of the internal combustion engine, controls the fuel injection unit and the ignition unit according to the measured crank angle to ignite the air-fuel mixture at a first ignition timing in the specified cylinder, which stops in the preset cycle range, and to start the internal combustion engine.

In response to a stop instruction of the internal combustion engine, the fourth internal combustion engine system of the invention injects the fuel according to the measured crank angle at the specific fuel injection timing immediately before a stop of the internal combustion engine into the specified cylinder, which stops in the preset cycle range including part of the compression stroke when the internal combustion engine stops at the predicted stop position. When the predicted stop position of the internal combustion engine after the fuel injection at the specific fuel injection timing into the specified cylinder leads to the determination that the stop position of the specified cylinder receiving the fuel injection passes over the ignition-inducing stop position, the fourth internal combustion engine system ignites the air-fuel mixture in the specified cylinder before the stop position of the specified cylinder passes over the ignition-inducing stop position. This arrangement desirably retains unexpected combustion of the air-fuel mixture caused by, for example, spontaneous ignition in the specified cylinder receiving the fuel injection, thus effectively preventing potential 2 vibrations due to the unexpected combustion. In response to a start instruction of the internal combustion engine, the fourth internal combustion engine system of the invention ignites the air-fuel mixture at the first ignition timing in the specified cylinder, which stops in the preset cycle range, based on the measured crank angle, and accordingly starts the internal combustion engine. When the stop position of the specified cylinder receiving the fuel injection does not pass over the ignition-inducing stop position, the air-fuel mixture is ignited at the first ignition timing in the specified cylinder. This ensures a quick start of the internal combustion engine. The fuel injection unit may individually inject the supply of fuel into respective intake systems of the multiple cylinders of the internal combustion engine.

In the fourth internal combustion engine system of the invention that ignites the air-fuel mixture in the specified cylinder receiving the fuel injection before the stop position of the specified cylinder passes over the ignition-inducing stop position, it is preferable that, in response to the determination that the stop position of the specified cylinder receiving the fuel injection passes over the ignition-inducing stop position, the stop control module controls the ignition unit to ignite the air-fuel mixture in a compression stroke of the specified cylinder. This arrangement ensures combustion of the air-fuel mixture prior to a rise of compression pressure, thus effectively preventing undesirable vibrations due to the combustion. The ignition-inducing stop position may represent a top dead center in a compression stroke of the specified cylinder receiving the fuel injection.

In the fourth internal combustion engine system of the invention that ignites the air-fuel mixture in the specified cylinder receiving the fuel injection before the stop position of the specified cylinder passes over the ignition-inducing stop position, it is also preferable that, in response to the determination that the stop position of the specified cylinder receiving the fuel injection passes over the ignition-inducing stop position, the stop control module controls the fuel injection unit to inject the fuel in an intake stroke of a next cylinder, which goes into a compression stroke after the specified cylinder, and the start control module controls the fuel injection unit and the ignition unit to ignite the air-fuel mixture at a first ignition timing in the next cylinder and to start the internal combustion engine. This arrangement enables the air-fuel mixture to be ignited at the first ignition timing in the next cylinder, thus ensuring a quick start of the internal combustion engine.

The present invention is also directed to a stop position prediction method that predicts a stop position of an internal combustion engine. The stop position prediction method predicts the stop position of the internal combustion engine, based on measured rotation speed of the internal combustion engine when one of multiple cylinders of the internal combustion engine passes over a top dead center during a decrease in rotation speed of the internal combustion engine under prohibition of fuel injection into the internal combustion engine.

The stop position prediction method of the invention predicts the stop position of the internal combustion engine, based on the measured rotation speed of the internal combustion engine when one of the multiple cylinders of the internal combustion engine passes over the top dead center during a decrease in rotation speed of the internal combustion engine under prohibition of fuel injection into the internal combustion engine. There is a relatively little variation in rotation speed of the internal combustion engine at the timing when one of the multiple cylinders of the internal combustion engine passes over the top dead center. The stop position of the internal combustion engine is predictable with high accuracy, based on the rotation speed of the internal combustion engine having a relatively little variation.

The present invention is also directed to a first internal combustion engine control method that controls an internal combustion engine. The internal combustion engine includes an air intake regulation unit that regulates an amount of intake air into the internal combustion engine; a fuel injection unit that is capable of individually injecting a supply of fuel into multiple cylinders of the internal combustion engine; an ignition unit that is capable of individually igniting an air-fuel mixture of the intake air and the injected fuel in the multiple cylinders of the internal combustion engine; and a crank angle measurement unit that measures a crank angle of the internal combustion engine. In response to a stop instruction of the internal combustion engine, the first internal combustion engine control method predicts a stop position of the internal combustion engine and controls the fuel injection unit and the air intake regulation unit according to the crank angle measured by the crank angle measurement unit to inject the fuel at a specific fuel injection timing immediately before a stop of the internal combustion engine into a specified cylinder, which stops in a preset cycle range including part of a compression stroke when the internal combustion engine stops at the predicted stop position and to increase the amount of intake air in the course of fuel injection at the specific fuel injection timing.

In response to a stop instruction of the internal combustion engine, the first internal combustion engine control method of the invention injects the fuel according to the measured crank angle at the specific fuel injection timing immediately before a stop of the internal combustion engine into the specified cylinder, which stops in the preset cycle range including part of the compression stroke when the internal combustion engine stops at the predicted stop position. The amount of intake air is increased in the course of fuel injection at the specific fuel injection timing. The increased amount of intake air during fuel injection effectively diffuses the fuel injected into the specified cylinder stopping in the preset cycle range and enables sufficient combustion for a restart of the internal combustion engine. This ensures a quick start of the internal combustion engine.

The present invention is also directed to a second internal combustion engine control method that controls an internal combustion engine. The internal combustion engine includes an air intake regulation unit that regulates an amount of intake air into the internal combustion engine; a fuel injection unit that is capable of individually injecting a supply of fuel into multiple cylinders of the internal combustion engine; an ignition unit that is capable of individually igniting an air-fuel mixture of the intake air and the injected fuel in the multiple cylinders of the internal combustion engine; and a crank angle measurement unit that measures a crank angle of the internal combustion engine. In response to a stop instruction of the internal combustion engine, the second internal combustion engine control method predicts a stop position of the internal combustion engine and controls the fuel injection unit according to the crank, angle measured by the crank angle measurement unit to inject the fuel at a specific fuel injection timing immediately before a stop of the internal combustion engine into a specified cylinder, which stops in a preset cycle range including part of a compression stroke when the internal combustion engine stops at the predicted stop position and to inject another supply of the fuel before the stop of the internal combustion engine into the specified cylinder, which has received the fuel injection at the specific fuel injection timing.

In response to a stop instruction of the internal combustion engine, the second internal combustion engine control method of the invention injects the fuel according to the measured crank angle at the specific fuel injection timing immediately before a stop of the internal combustion engine into the specified cylinder, which stops in the preset cycle range including part of the compression stroke when the internal combustion engine stops at the predicted stop position. The second internal combustion engine control method of the invention injects another supply of the fuel according to the measured crank angle before the stop of the internal combustion engine into the specified cylinder receiving the fuel injection. Such control enables the required amount of the fuel to be injected in two or more parts in the specified cylinder stopping in the preset cycle range, thus ensuring adequate regulation of the amount of fuel injection. This enables sufficient combustion for a restart of the internal combustion engine and ensures a quick start of the internal combustion engine.

The present invention is also directed to a third internal combustion engine control method that controls an internal combustion engine. The internal combustion engine includes an air intake regulation unit that regulates an amount of intake air into the internal combustion engine; a fuel injection unit that is capable of individually injecting a supply of fuel into multiple cylinders of the internal combustion engine; an ignition unit that is capable of individually igniting an air-fuel mixture of the intake air and the injected fuel in the multiple cylinders of the internal combustion engine; and a crank angle measurement unit that measures a crank angle of the internal combustion engine. In response to a stop instruction of the internal combustion engine, the third internal combustion engine control method predicts a stop position of the internal combustion engine and controls the fuel injection unit according to the crank angle measured by the crank angle measurement unit to inject the fuel at a specific fuel injection timing immediately before a stop of the internal combustion engine into a specified cylinder, which stops in a preset cycle range including part of a compression stroke when the internal combustion engine stops at the predicted stop position, and the third internal combustion engine control method predicts the stop position of the internal combustion engine after the fuel injection at the specific fuel injection timing into the specified cylinder, stopping in the preset cycle range, when the predicted stop position of the internal combustion engine leads to determination that a stop position of the specified cylinder receiving the fuel injection passes over an ignition-inducing stop position, said internal combustion engine control method controlling the ignition unit to ignite the air-fuel mixture in the specified cylinder before the stop position of the specified cylinder passes over the ignition-inducing stop position.

In response to a stop instruction of the internal combustion engine, the third internal combustion engine control method of the invention injects the fuel according to the measured crank angle at the specific fuel injection timing immediately before a stop of the internal combustion engine into the specified cylinder, which stops in the preset cycle range including part of the compression stroke when the internal combustion engine stops at the predicted stop position. When the predicted stop position of the internal combustion engine after the fuel injection at the specific fuel injection timing into the specified cylinder leads to the determination that the stop position of the specified cylinder receiving the fuel injection passes over the ignition-inducing stop position, the third internal combustion engine control method ignites the air-fuel mixture in the specified cylinder before the stop position of the specified cylinder passes over the ignition-inducing stop position. This arrangement desirably retains unexpected combustion of the air-fuel, mixture caused by, for example, spontaneous ignition in the specified cylinder receiving the fuel injection, thus effectively preventing potential vibrations due to the unexpected combustion.

In response to a start instruction of the internal combustion engine, any of the first through the third internal combustion engine control methods may control the fuel injection unit and the ignition unit according to the crank angle measured by the crank angle measurement unit to ignite the air-fuel mixture at a first ignition timing in the specified cylinder, which stops in the preset cycle range, and to start the internal combustion engine. This arrangement ensures a quick start of the internal combustion engine.

BEST MODES OF CARRYING OUT THE INVENTION

Figure 1:
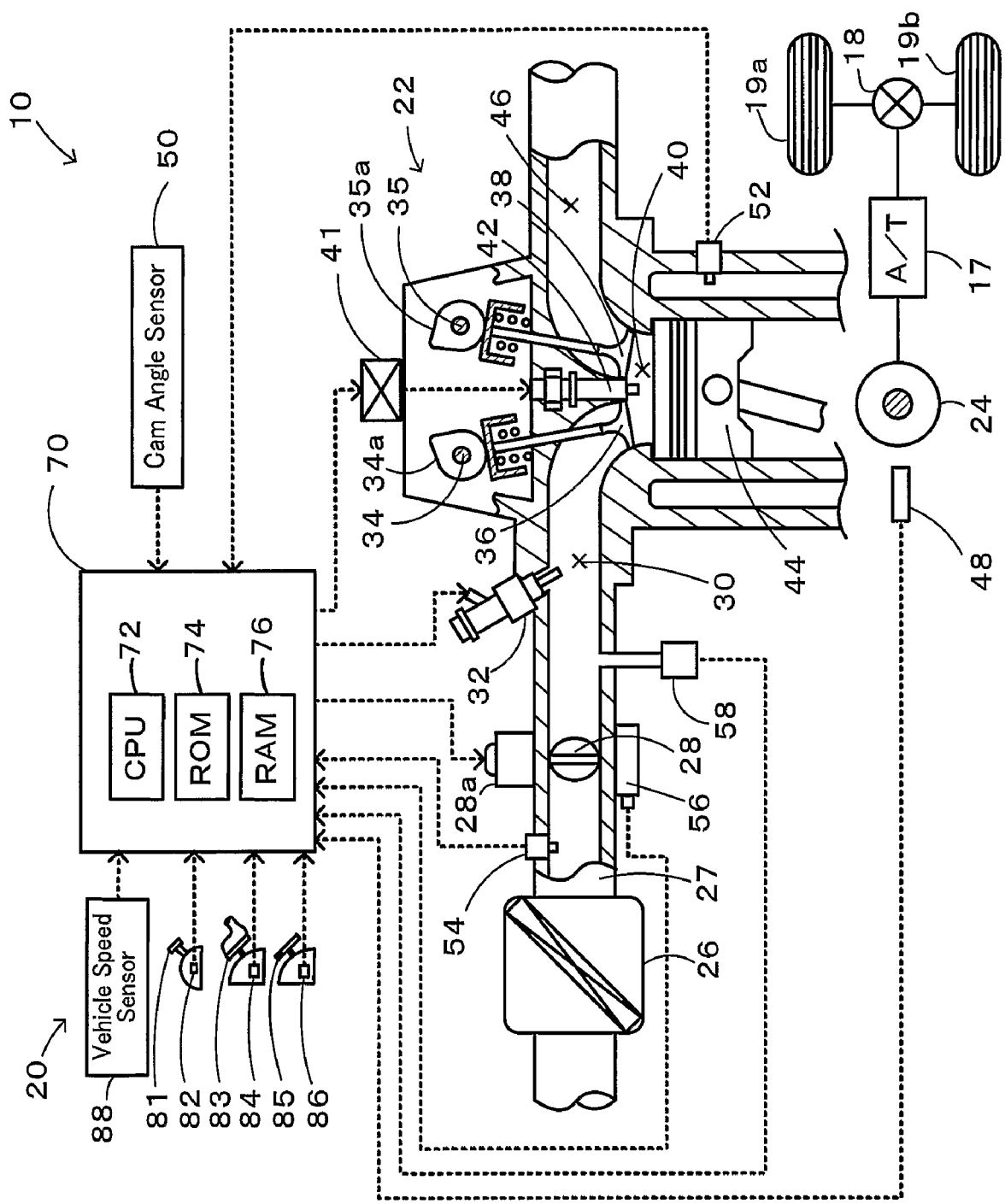
FIG. 1 schematically illustrates the configuration of a motor vehicle equipped with an internal combustion engine system in one embodiment of the invention.

One mode of carrying out the invention is described below as a preferred embodiment. FIG. 1 schematically illustrates the configuration of a motor vehicle 10 equipped with an internal combustion engine system 20 in one embodiment of the invention. As illustrated, the motor vehicle 10 includes an engine 22 driven with gasoline, an engine electronic control unit (hereafter referred to as engine ECU) 70 that controls the engine 22, an automatic transmission (AT) 17 that converts power of a crankshaft 24 of the engine 22 and outputs the converted power to drive wheels 19a and 19b via a differential gear 18, and an AT electronic control unit (not shown) that controls the automatic transmission 17. The engine 22 and the engine ECU 70 constitute the internal combustion engine system 20 of the embodiment.

Figure 2:
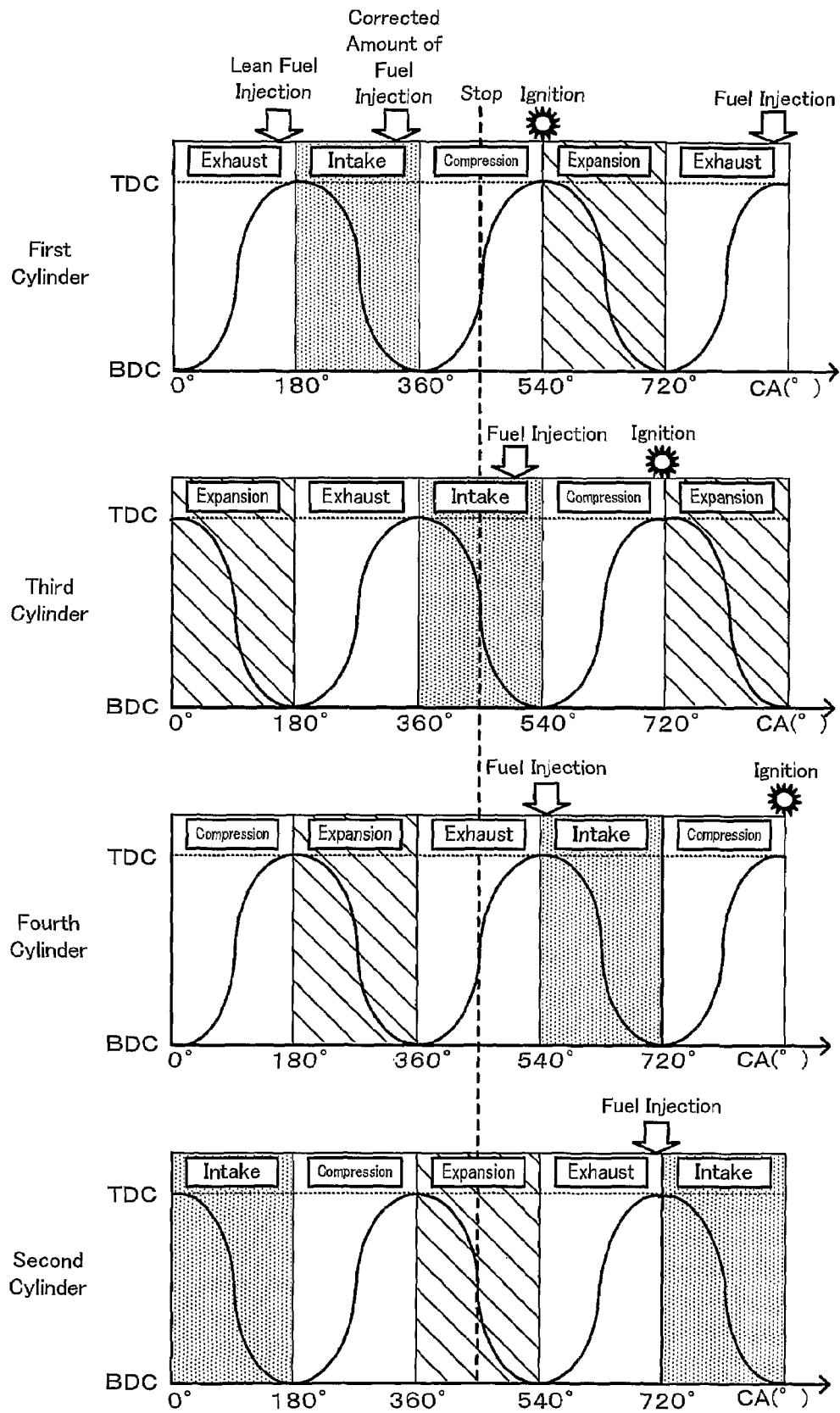
FIG. 2 shows one example of variations of a crank angle CA in four strokes in four cylinders of an engine included in the internal combustion engine system of the embodiment.

The engine 22 is an individual-injection-type 4-cylinder engine that is capable of individually injecting a supply of fuel in respective cylinders 22a to 22d of an intake manifold 30. Each of the four cylinders 22a to 22d in the engine 22 is driven in a cycle including an intake stroke, a compression stroke, an expansion stroke (combustion stroke), and an exhaust stroke. The first cylinder 22a, the second cylinder 22b, the third cylinder 22c, and the fourth cylinder 22d are arranged in series in this sequence, while the first cylinder 22a, the third cylinder 22c, the fourth cylinder 22d, and the second cylinder 22b are linked to the crankshaft 24 to have different crank angles CA by 180 degrees in this sequence. FIG. 2 shows variations of the crank angle CA in four strokes of the respective cylinders 22a to 22d. FIG. 2 also shows a fuel injection timing in engine stop control and a fuel injection timing and an ignition timing in an engine start control, which will be discussed later.

The engine 22 has an air cleaner 26 that cleans the intake air, a throttle valve 28 that is attached to an intake pipe 27 and is driven by a throttle motor 28a to regulate the amount of intake air, fuel injection valves 32 that are attached to branches of the intake manifold 30 diverging corresponding to the four cylinders 22a to 22d to individually inject a supply of fuel, that is, gasoline, in the respective cylinders 22a to 22d, and an intake valve 36 that is driven by a cam 34a of a cam shaft 34 rotating at a ratio of 1 rotation to 2 rotations of the crankshaft 24 to introduce the mixture of gasoline and the air (the air-fuel mixture) into respective combustion chambers 40. The engine 22 also includes an ignition plug 42 that applies a voltage to an ignition coil 41 integrated with an igniter at a timing from a compression stroke to an expansion stroke to generate an electric spark in the combustion chamber 40, an exhaust valve 38 that is driven by a cam 35a of a cam shaft 35 rotating at a ratio of 1 rotation to 2 rotations of the crankshaft 24 to discharge the combustion exhaust gas from the combustion chamber 40 into an exhaust manifold 46, and a catalytic converter (not shown) of a three-way catalyst that converts toxic compounds in the exhaust gas, that is, carbon monoxide (CO), hydrocarbons (HC), and nitrogen oxides (NOx). The reciprocating motions of a piston 44 pressed down by the energy of explosive combustion of the air-fuel mixture in the combustion chamber 40 are converted into the rotating motions of the crankshaft 24.

A crank angle sensor 48 is mounted on the crankshaft 24 of the engine 22 to measure a crank angle CA as a rotation angle of the crankshaft 24. A cam angle sensor 50 is mounted on each of the cam shafts 34 and 35 to measure a cam angle as a rotation angle of the cam shaft 34 or 35. The engine 22 is also equipped with various sensors to observe the conditions of the engine 22. Such sensors include a water temperature sensor 52 that measures the temperature of cooling water in the engine 22, an intake air temperature sensor 54 that measures the temperature of the intake air, a throttle valve position sensor 56 that detects the position of the throttle valve 28 or the throttle position, and a vacuum sensor 58 that measures the amount of intake air as the load of the engine 22: Output signals of these sensors are input into the engine ECU 70. The crank angle sensor 48 is an MRE rotation sensor having a magnetic resistance element arranged at a position to face a magnet rotor (not shown) attached to the crankshaft 24. The crank angle sensor 4 generates a pulse at every preset angle (for example, at every crank angle CA of 10 degrees). In the structure of this embodiment, the engine ECU 70 specifies the crank angle CA or the rotation angle of the crankshaft 24 in response to the pulses generated by the crank angle sensor 48 and computes rotation speed Ne of the engine 22.

The engine ECU 70 is constructed as a microcomputer including a CPU 72, a ROM 74 that stores processing programs, a RAM 76 that temporarily store data, input and output ports (not shown), and a communication port (not shown). The engine ECU 70 receives, via its input port, signals from the various sensors, that is, the crank angle CA from the crank angle sensor 48, the cam angles from the cam angle sensors 50, the temperature of cooling water from the water temperature sensor 52, the temperature of the intake air from the intake air temperature sensor 54, the throttle position from the throttle valve position sensor 56, and the amount of intake air from the vacuum sensor 58. The engine ECU 70 also receives, via its input port, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The engine ECU 70 outputs, via its output port, driving signals to the fuel injection valves 32 and to the throttle motor 28a that adjusts the position of the throttle valve 28, as well as control signals to the ignition coil 41.

The description now regards the operations of the internal combustion engine system 20 mounted on the motor vehicle 10 of the embodiment having the configuration discussed above, especially a series of control at an idle stop of the engine 22. In the motor vehicle 10 of the embodiment, the engine 22 automatically stops under preset auto stop conditions, for example, the driver's depression of the brake pedal 85 at the vehicle speed V equal to 0. The engine 22 automatically starts under preset auto start conditions, for example, the driver's release of the brake pedal 85 after an auto stop of the engine 22. The auto stop control and the auto start control of the engine 22 are not characteristic of the invention and are thus not described in detail.

Figure 3:
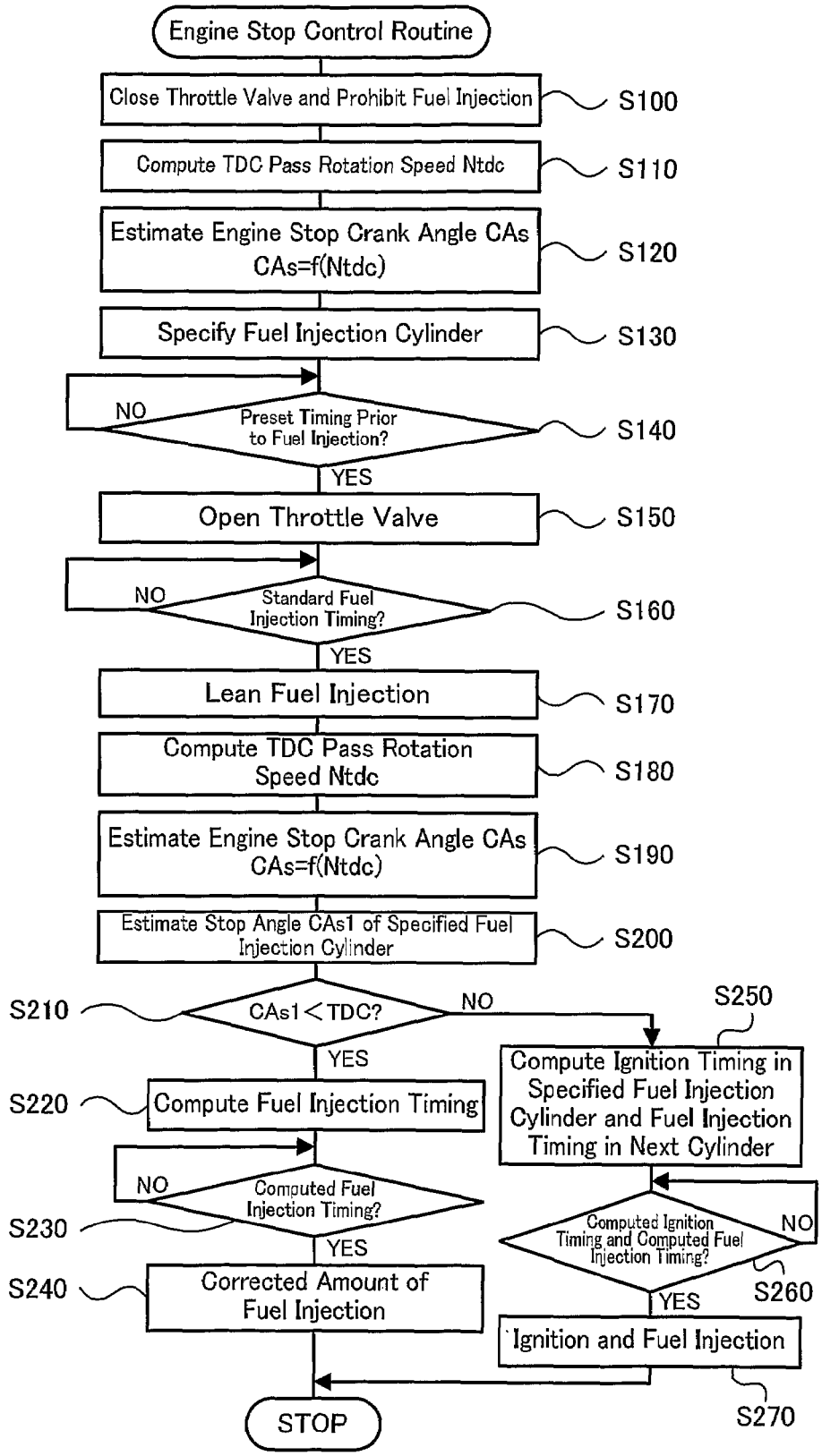
FIG. 3 is a flowchart showing an engine stop control routine executed by an engine ECU included in the internal combustion engine system of the embodiment.

FIG. 3 is a flowchart showing an engine stop control routine executed by the engine ECU 70 under the preset auto stop conditions. In the engine stop control routine of FIG. 3, the CPU 72 of the engine ECU 70 first closes the throttle valve 28 and prohibits fuel injection into the respective cylinders 22a to 22d (step S100). This series of fuel cut operations lowers the rotation speed Ne of the engine 22.

Figure 4:
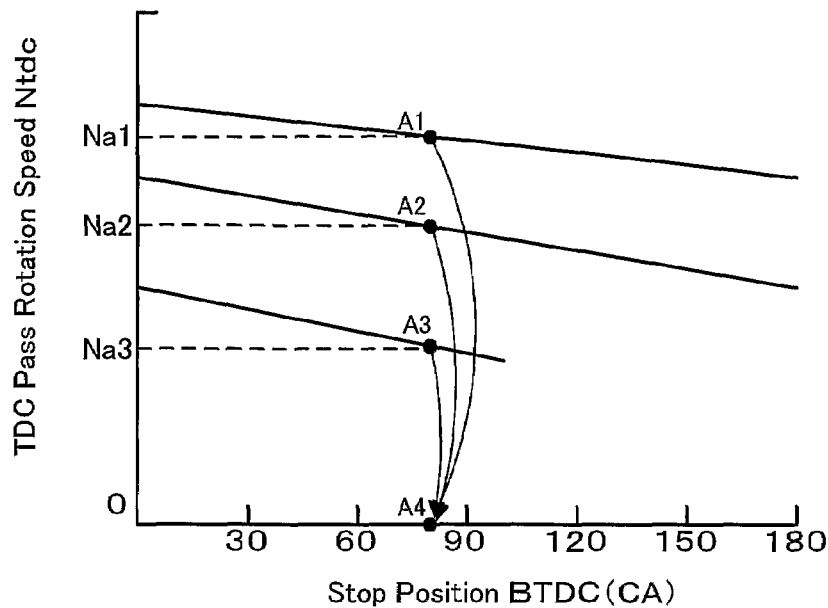
FIG. 4 shows variations in TDC pass rotation speed Ntdc against the stop position BTDC of the engine.

The CPU 72 computes rotation speed Ne of the engine 22 at a timing when one of the cylinders 22a to 22d of the engine 22 passes over a top dead center TDC (step S110). The rotation speed Ne of the engine 22 at this timing is hereafter referred to as the TDC pass rotation speed Ntdc. The concrete procedure of the embodiment detects a pass of one of the cylinders 22a to 22d of the engine 22 over the top dead center TDC, based on the crank angle CA measured by the crank angle sensor 48, and computes the TDC pass rotation speed Ntdc from the time interval of pulse generation and the number of pulses generated per unit time by the crank angle sensor 48 during the pass of the cylinder over the top dead center TDC. The CPU 72 estimates an engine stop crank angle CAs at a stop of the engine 2 from the computed TDC pass rotation speed Ntdc (step S120). There is a relatively little variation in rotation speed Ne of the engine 22 at the timing when one of the cylinders 22a to 22d of the engine 22 passes over the top dead center TDC. Variations in TDC pass rotation speed Ntdc against the engine stop crank angle CAs at the stop of the engine 22 are experimentally or otherwise obtained with a relatively high probability. FIG. 4 shows one example of the variations in TDC pass rotation speed Ntdc against the stop position BTDC of the engine 22. In the illustrated example of FIG. 4, the engine 22 is expected to stop at a stop position of a point A4, in response to the computed TDC pass rotation speed Ntdc equal to a rotation speed Na1 at a point A1, equal to a rotation speed Na2 at a point A2, or equal to a rotation speed Na3 at a point A3. When the computed TDC pass rotation speed Ntdc is equal to the rotation speed Na1 at the point A1, the engine 22 is expected to pass over the top dead center TDC twice and stop at the stop position of the point A4. When the computed TDC pass rotation speed Ntdc is equal to the rotation speed Na2 at the point A2, the engine 22 is expected to pass over the top dead center TDC once and stops at the stop position of the point A4. When the computed TDC pass rotation speed Ntdc is equal to the rotation speed Na3 at the point A4, the engine 22 is expected to stop at the stop position of the point A4 without passing over the top dead center TDC. The concrete procedure of the embodiment stores in advance an experimentally or otherwise obtained variation in engine stop crank angle CAs of the engine 22 against the TDC pass rotation speed Ntdc as a map in the ROM 74 and reads the engine stop crank angle CAs corresponding to the given TDC pass rotation speed Ntdc from the map.

Figure 5:
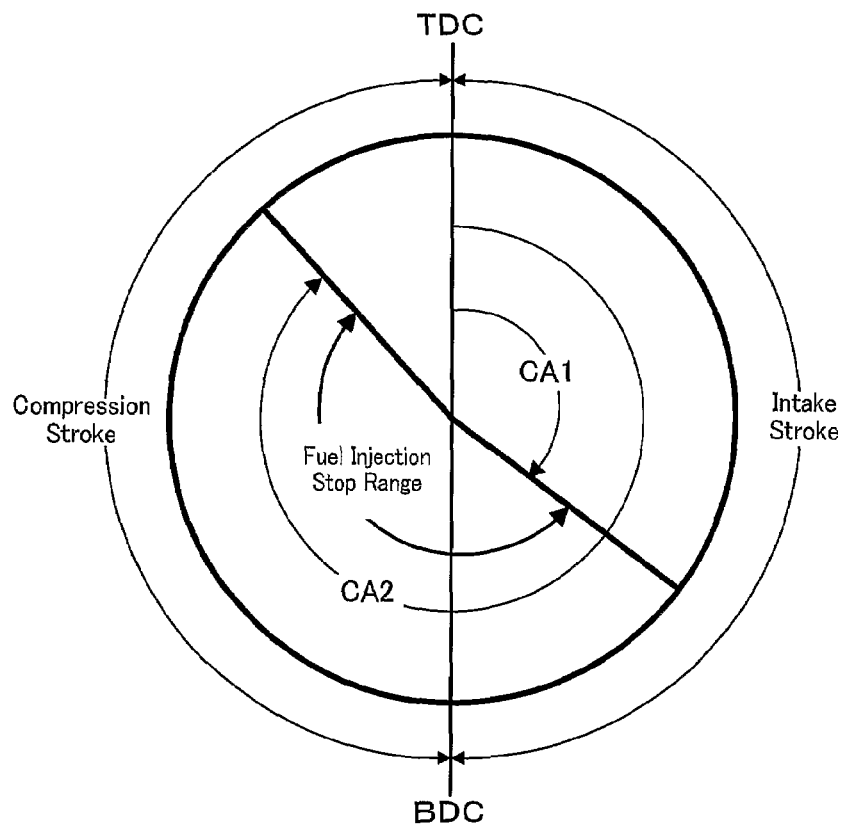
FIG. 5 shows one example of a fuel injection stop range.

Based on the estimated engine stop crank angle CAs, a cylinder that stops at the crank angle CA in a range of a preset first angle CA1 to a preset second angle CA2 (hereafter referred to as the fuel injection stop range) from the intake stroke to the compression stroke at a stop of the engine 22 is specified as a cylinder in which the fuel is to be injected prior to the stop of the engine 22 (hereafter referred to as the fuel injection cylinder) (step S130). In the fuel, injection stop range, the air-fuel mixture is combustible at a first ignition timing (close to the top dead center TDC in the compression stroke) for are start of the engine 22 after a stop of the engine 22. The combustion of the air-fuel mixture at the first ignition timing quickly raises the rotation speed Ne of the engine 22. An especially preferable area in the fuel injection stop range is between the engine stop positions BTDC of 60 degrees and BTDC of 120 degrees. FIG. 5 shows one example of the fuel injection stop range.

The CPU 72 waits until a preset timing that is a predetermined time period prior to a standard fuel injection timing in the specified fuel injection cylinder (step S140) and opens the throttle valve 28 to a fuel injection opening, which is equal to or greater than an angle required for idling (step S150). The CPU 72 then waits until the standard fuel injection timing in the specified fuel injection cylinder (step S160) and performs lean fuel injection to inject a combustible lean air-fuel mixture from the fuel injection valve 32 into the specified fuel injection cylinder (step S170). The opening operation of the throttle valve 28 increases the amount of intake air and improves the diffusion of the injected fuel. The timing of opening the throttle valve 28, that is, the preset timing of the predetermined time period prior to the standard fuel injection timing, is accordingly determined by taking into account a delayed response of the amount of intake air to the opening operation of the throttle valve 28. The concrete process of lean fuel injection computes a fuel injection time corresponding to a specific amount of fuel injection, which is slightly greater than a threshold amount of fuel injection as a combustible lean limit and is specified based on the amount of intake air measured by the vacuum sensor 58 and the intake air temperature measured by the intake air temperature sensor 54. The lean fuel injection process then opens the fuel injection valve 32 for the computed fuel injection time to inject the supply of fuel into the specified fuel injection cylinder. The reason of such lean fuel injection will be discussed later. The standard fuel injection timing in the specified fuel injection cylinder is set to a timing when the specified fuel injection cylinder is close to the top dead center TDC in the exhaust stroke. This enables the injected fuel to form the sufficiently diffused air-fuel mixture.

On completion of the lean fuel injection, the CPU 72 computes the TDC pass rotation speed Ntdc when one of the cylinders 22a to 22d of the engine 22 passes over the top dead center TDC immediately after the lean fuel injection (step S180) and estimates the engine stop crank angle CAs at a stop of the engine 22 from the computed TDC pass rotation speed Ntdc (step S190). A stop angle CAs1 of the specified fuel injection cylinder is estimated from the estimated engine stop crank angle CAs (step S200). The estimated stop angle CAs1 of the specified fuel injection cylinder is compared with the top dead center TDC in the compression stroke (step S210). As mentioned above, there is a relatively little variation in rotation speed Ne of the engine 22 when one of the cylinders 22a to 22d passes over the top dead center TDC. The engine stop crank angle CAs estimated from the computed TDC pass rotation speed Ntdc after the lean fuel injection is thus about to the estimated engine stop crank angle CAs prior to the lean fuel injection. The stop angle CAs1 of the specified fuel injection cylinder accordingly does not pass over the top dead center TDC in the compression stroke. When the stop angle CAs1 of the specified fuel injection cylinder does not pass over the top dead center TDC in the compression stroke at step S210, the CPU 72 computes a fuel injection timing in the intake stroke to ingest and diffuse the fuel injected in the specified fuel injection cylinder (step S220). The CPU 72 waits until the computed fuel injection timing (step S230) and injects a corrected amount of the fuel to make the air-fuel ratio of the air-fuel mixture ingested in the specified fuel injection cylinder sufficiently close to the stoichiometric air-fuel ratio (step S240). The CPU 72 then exits from the engine stop control routine. The corrected amount of the fuel to be injected is determined by multiplying a difference between the amount of lean fuel injection and the amount of fuel injection for substantially achieving the stoichiometric air-fuel ratio by a preset correction factor. The amount of the fuel for lean fuel injection depends upon the amount of intake air and the intake air temperature. The preset correction factor may be approximate to a value '1'. This series of control operations enables an adequate amount of fuel to be injected in the cylinder stopping at the crank angle CA in the fuel injection storage range, that is, the specified fuel injection cylinder, prior to the stop of the engine 22. In the illustrated example of FIG. 2, the first cylinder 22a is the specified fuel injection cylinder expected to stop at the crank angle CA in the fuel injection stop range and receives the lean fuel injection. In the state of FIG. 2, the stop angle CAs1 of the first cylinder 22a estimated from the TDC pass rotation speed Ntdc does not pass over the top dead center TDC in the compression stroke. Under such conditions, the first cylinder 22a receives the lean fuel injection of the fuel at the standard fuel injection timing close to the top dead center TDC in the exhaust stroke, and receives the corrected amount of fuel injection in the intake stroke.

Figure 7:
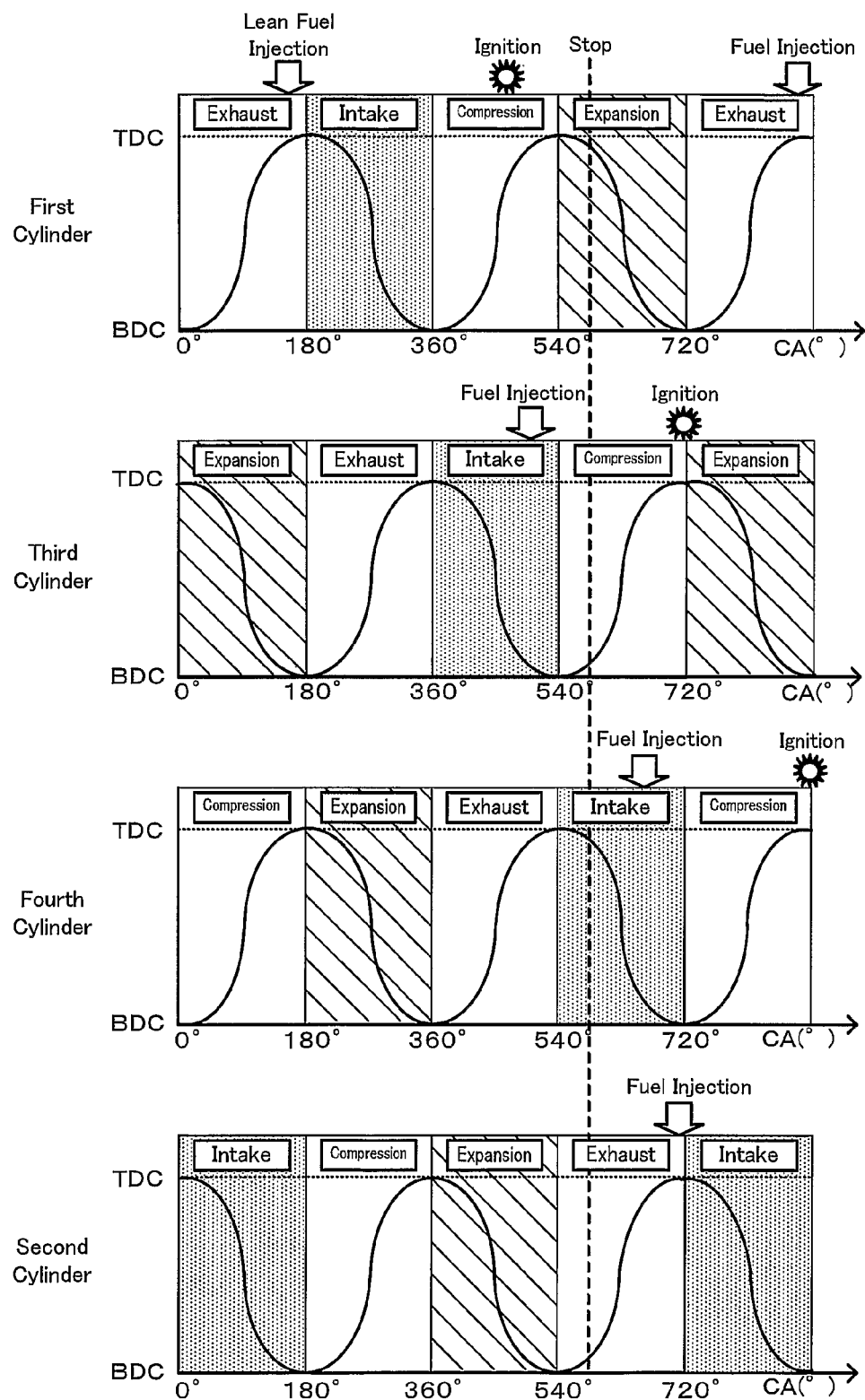
FIG. 7 shows another example of the variations of the crank angle CA in the four strokes in the four cylinders of the engine.

The varying conditions and the aged deterioration of the engine 22 may cause the estimated engine stop crank angle CAs after the lean fuel injection to be significantly deviated from the estimated engine stop crank angle CAs prior to the lean fuel injection. The stop angle CAs1 of the specified fuel injection cylinder may accordingly pass over the top dead center TDC in the compression stroke. In this case, the CPU 72 computes an ignition timing in the compression stroke to enable relatively slow combustion of the air-fuel mixture in the specified fuel injection cylinder and a fuel injection timing in the intake stroke to ingest and diffuse the fuel in a next cylinder going into the compression stroke after the specified fuel injection cylinder (step S250). The CPU 72 waits for the computed ignition timing and the computed fuel injection timing for the next cylinder (step S260) and controls the ignition plug 42 to generate an electric spark and injects a specified amount of the fuel for substantially achieving the stoichiometric air-fuel ratio, into the next cylinder (step S270). The engine stop control routine is terminated after combustion of the air-fuel mixture in the combustion chamber of the next cylinder expected to stop at the crank angle CA in the fuel injection stop range. The series of engine stop control enables the air-fuel mixture to be ignited for combustion in the compression stroke of the fuel injection cylinder. This desirably eliminates potential troubles (for example, undesirable vibrations during combustion) due to a compression-inducing temperature rise and resulting spontaneous ignition of the air-fuel mixture in the vicinity of the top dead center from the compression stroke to the expansion stroke of the cylinder receiving the fuel injection. This also eliminates potential troubles (for example, poor emission and deterioration of the catalyst by discharge of the non-combusted air-fuel mixture to the exhaust system) due to no spontaneous ignition of the air-fuel mixture. The fuel injection into the next cylinder going into the compression stroke after the specified fuel injection cylinder enables the air-fuel mixture to be ignited at a first ignition timing in the next cylinder, which has received the fuel injection in the intake stroke, for restart of the engine 22. Even when the engine stop crank angle CAs of the specified fuel injection cylinder that has been expected to stop at the crank angle CA in the fuel injection stop range and has received the fuel injection, passes over the top dead center TDC in the compression stroke, this series of control ensures a quick restart of the engine 22. In the illustrated example of FIG. 7, the first cylinder 22a is the specified fuel injection cylinder expected to stop at the crank angle CA in the fuel injection stop range and receives the lean fuel injection. In the state of FIG. 7, the stop angle CAs1 of the first cylinder 22a estimated from the TDC pass rotation speed Ntdc passes over the top dead center TDC in the compression stroke. Under such conditions, the first cylinder 22a receives the lean fuel injection of the fuel at the standard fuel injection timing close to the top dead center TDC in the exhaust stroke, but does not receive the corrected amount of fuel injection in the intake stroke. The air-fuel mixture is ignited in the compression stroke of the first cylinder 22a. The next third cylinder 22c going into the compression stroke after the first cylinder 22a receives the fuel injection in the intake stroke prior to the stop of the engine 22.

Figure 6:
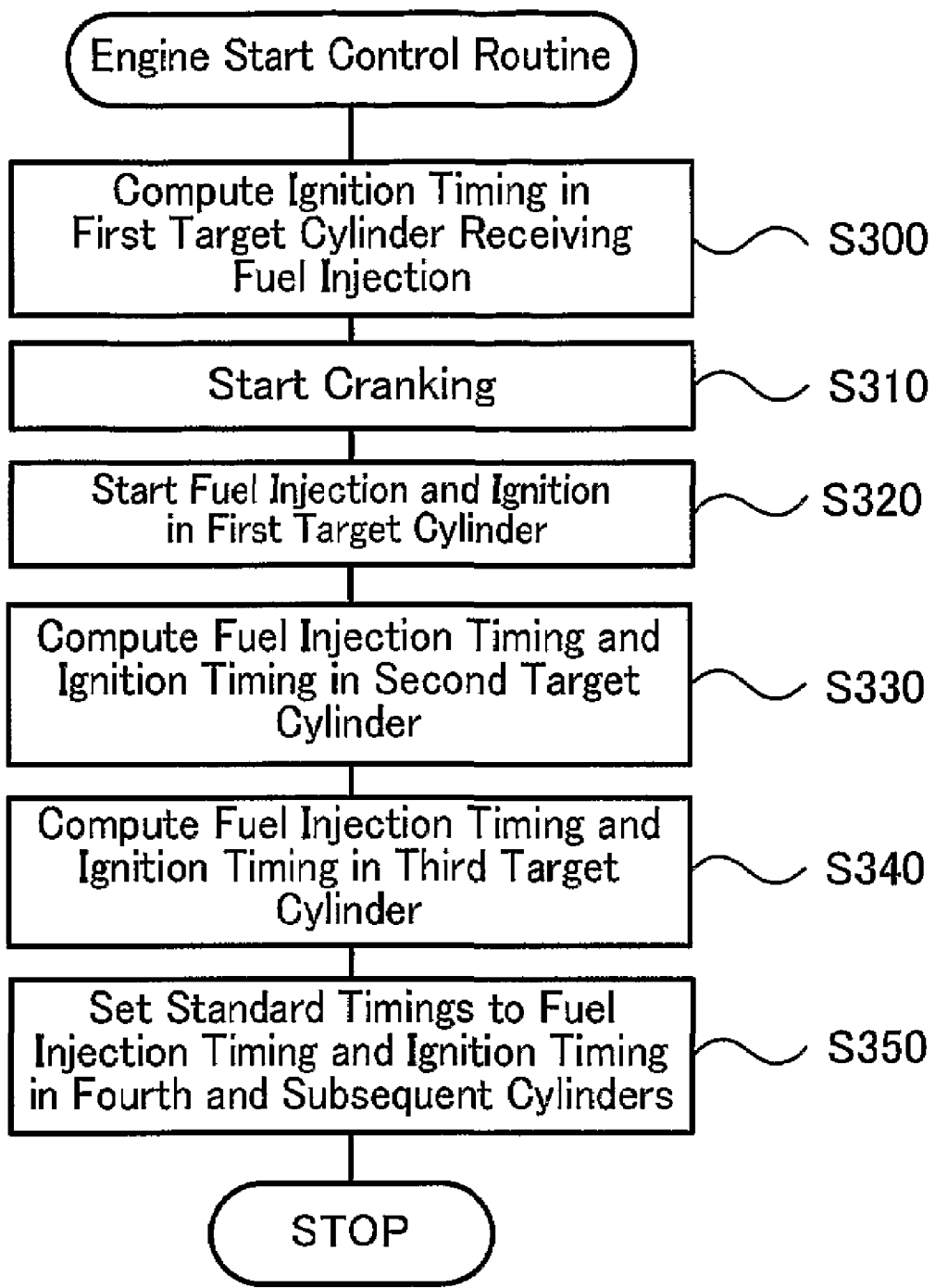
FIG. 6 is a flowchart showing an engine start control routine executed by the engine ECU.

FIG. 6 is a flowchart showing an engine start control routine executed by the engine ECU 70 under preset auto start conditions. In the engine start control routine, the CPU 72 of the engine ECU 70 first computes an ignition timing in a first target cylinder, which receives the fuel injection at a stop of the engine 22 (step S300). When it is determined at step S210 in the engine stop control routine of FIG. 3 that the stop angle CAs1 of the specified fuel injection cylinder does not pass over the top dead center TDC in the compression stroke, the first target cylinder is the specified fuel injection cylinder. When it is determined at step S210 that the stop angle CAs1 of the specified fuel injection cylinder passes over the top dead center TDC in the compression stroke and the air-fuel mixture is ignited in the specified fuel injection cylinder, the first target cylinder is the next cylinder that receives the fuel injection in the intake stroke in combination with the ignition. The CPU 72 then starts cranking (step S310) and starts fuel injection from the fuel injection valve 32 and ignition with the ignition plug 42 in the first target cylinder (step S320). The CPU 72 subsequently computes a fuel injection timing and an ignition timing in a second target cylinder, which has an ignition timing after the first target cylinder receiving the fuel injection at the stop of the engine 22 (step S330). In the illustrated example of FIG. 2, it is assumed that the engine 22 starts when the first cylinder 22a has received the fuel injection and is at a stop in the compression stroke in the fuel injection stop range. The third cylinder 22c having an ignition timing after the first cylinder 22a is at a stop in the intake stroke and has not received the fuel injection. Injection of the fuel and introduction of the injected fuel into the combustion chamber 40 in the intake stroke are required to enable combustion of the air-fuel mixture at a first ignition timing in the third cylinder 22c. Namely the fuel injection timing in the third cylinder 22c is before the end of the intake stroke. In the illustrated example of FIG. 7, the stop angle CAs1 of the first cylinder 22a, which has received the fuel injection, passes over the top dead center TDC in the compression stroke. It is assumed that the engine 22 starts in the state of the fuel injection into the third cylinder 22c in the intake stroke prior to the stop of the engine 22, in combination with the ignition of the air-fuel mixture in the first cylinder 22a. In this case, the fuel injection timing and the ignition timing are computed to enable combustion of the air-fuel mixture at a first ignition timing in the fourth cylinder 22d, which has an ignition timing after the third cylinder 22c. After computation of the fuel injection timing and the ignition timing in the second target cylinder, the CPU 72 computes a fuel injection timing and an ignition timing in a third target cylinder, which has an ignition timing after the second target cylinder (step S340). The CPU 72 sets standard timings to a fuel injection timing and an ignition timing in fourth and subsequent target cylinders, which sequentially have ignition timings after the third target cylinder (step S350), and exits from the engine start control routine. The engine start control of this embodiment computes the fuel injection timing and the ignition timing and actually performs fuel injection at the computed fuel injection timing and ignition at the computed ignition timing. For restart of the engine 22, this control enables combustion in the target cylinder stopping after the fuel injection, as well as combustion in the subsequent target cylinders sequentially having ignition timings. The combustion energy is thus consumable to raise the rotation speed Ne of the engine 22. This ensures a quick start of the engine 22.

As described above, the internal combustion engine system 20 of the embodiment estimates the engine stop crank angle CAs of the engine 22, based on the TDC pass rotation speed Ntdc, which represents the rotation speed Ne of the engine 22 at the timing when one of the cylinders 22a to 22d of the engine 22 passes over the top dead center TDC. The rotation speed Ne of the engine 22 has a relatively little variation at this timing. This ensures accurate estimation of the engine stop crank angle CAs of the engine 22 and adequate prediction of the cylinder stopping in the fuel injection stop range. Fuel injection into the target cylinder, which is expected to stop in the fuel injection stop range, prior to the stop of the engine 22 enables the air-fuel mixture to be ignited for combustion at a first ignition timing in the target cylinder receiving the fuel injection for a restart of the engine 22. The combustion energy is consumable to raise the rotation speed Ne of the engine 22. This ensures a quick start of the engine 22.

The internal combustion engine system 20 of the embodiment opens the throttle valve 28 to increase the amount of intake air, synchronously with fuel injection into the target cylinder, which is expected to stop in the fuel injection stop range, at a fuel injection timing prior to the stop of the engine 22. The increased amount of intake air effectively diffuses the fuel injected into the target cylinder stopping in the fuel injection stop range and enables sufficient combustion for a restart of the engine 22. This ensures a quick start of the engine 22.

The internal combustion engine system 20 of the embodiment performs the lean fuel injection at the standard fuel injection timing into the fuel injection cylinder that is expected to stop in the fuel injection stop range. After confirmation that the fuel injection cylinder receiving the lean fuel injection does not pass over the top dead center TDC in the compression stroke, the internal combustion engine system 20 injects a corrected amount of the fuel to make the air-fuel ratio of the air-fuel mixture ingested in the fuel injection cylinder sufficiently close to the stoichiometric air-fuel ratio. This arrangement enables an adequate amount of the fuel to be injected into the fuel combustion cylinder, which is expected to stop in the fuel injection stop range with high probability, for effective combustion at a restart of the engine 22. This ensures a quick start of the engine 22.

When the cylinder, which has been expected to stop in the fuel injection stop range and has received the fuel injection, is later presumed to stop over the top dead center TDC in the compression stroke, the internal combustion engine system 20 of the embodiment ignites the air-fuel mixture for gentle combustion in the cylinder receiving the fuel injection in the compression stroke. This desirably eliminates potential troubles (for example, undesirable vibrations during combustion) due to a compression-inducing temperature rise and resulting spontaneous ignition of the air-fuel mixture in the vicinity of the top dead center from the compression stroke to the expansion stroke of the cylinder receiving the fuel injection. This also eliminates potential troubles (for example, poor emission and deterioration of the catalyst by discharge of the non-combusted air-fuel mixture to the exhaust system)

due to no spontaneous ignition of the air-fuel mixture. The cylinder expected to stop in the fuel injection stop range receives the lean fuel injection, which leads to gentle combustion in the compression stroke. Ignition into the fuel injection cylinder in its compression stroke is synchronous with fuel injection into the next cylinder that going into the compression stroke after the fuel injection cylinder. For restart of the engine 22, the air-fuel mixture is ignited at a first ignition timing in the next cylinder receiving the fuel injection. This ensures a quick start of the engine 22.

The internal combustion engine system 20 of the embodiment estimates the engine stop crank angle CAs of the engine 22 from one TDC pass rotation speed Ntdc, when one of the cylinders 22a to 22d passes over the top dead center TDC. One possible modification may estimate the engine stop crank angle CAs of the engine 22 from multiple consecutive TDC pass rotation speeds Ntdc when the respective cylinders 22a to 22d pass over the top dead center TDC. The modified control procedure may estimate the engine stop crank angle CAs of the engine 22 based on the record of the TDC pass rotation speed Ntdc, for example, two consecutive TDC pass rotation speeds Ntdc. Such modification enables accurate estimation of the engine stop crank angle CAs of the engine 22 even under the varying conditions and the aged deterioration of the engine 22. The engine stop crank angle CAs after the fuel injection may also be estimated from multiple consecutive TDC pass rotation speed Ntdc.

The internal combustion engine system 20 of the embodiment estimates the engine stop crank angle CAs of the engine 22 from the TDC pass rotation speed Ntdc when one of the cylinders 22a to 22d passes over the top dead center TDC. This technique is, however, not restrictive in any sense, and any other suitable technique may be applied to estimate the engine stop crank angle CAs of the engine 22.

The internal combustion engine system 20 of the embodiment closes the throttle valve 28 in initiation of the engine stop control. The internal combustion engine system 20 of the embodiment opens the throttle valve 28 to increase the amount of intake air, synchronously with fuel injection into the target cylinder, which is expected to stop in the fuel injection stop range, at a fuel injection timing prior to the stop of the engine 22. One possible modification may open the throttle valve 28 to a specific fuel injection opening in initiation of the engine stop control, while not opening the throttle valve 28 in the course of fuel injection into the cylinder stopping in the fuel injection stop range at the fuel injection timing prior to the stop of the engine 22. Another possible modification may close the throttle valve 28 in initiation of the engine stop control, while keeping the throttle valve 28 in the closed position in the course of fuel injection into the cylinder stopping in the fuel injection stop range at the fuel injection timing prior to the stop of the engine 22.

The internal combustion engine system 20 of the embodiment performs the lean fuel injection at the standard fuel injection timing into the fuel injection cylinder that is expected to stop in the fuel injection stop range. The amount of lean fuel injection is slightly greater than the threshold amount of fuel injection as a combustible lean limit. The amount of lean fuel injection is, however, not restricted to this value and may be a greater value.

The internal combustion engine system 20 of the embodiment performs the lean fuel injection at the standard fuel injection timing into the fuel injection cylinder that is expected to stop in the fuel injection stop range. After confirmation that the fuel injection cylinder receiving the lean fuel injection does not pass over the top dead center TDC in the compression stroke, the internal combustion engine system 20 injects a corrected amount of the fuel to make the air-fuel ratio of the air-fuel mixture ingested in the fuel injection cylinder sufficiently close to the stoichiometric air-fuel ratio. One possible modification may inject a specified amount of the fuel for substantially achieving the stoichiometric air-fuel ratio, at the standard fuel injection timing into the fuel injection cylinder stopping in the fuel injection stop range and may omit subsequent fuel injection.

When the cylinder, which has been expected to stop in the fuel injection stop range and has received the fuel injection, is later presumed to stop over the top dead center TDC in the compression stroke, the internal combustion engine system 20 of the embodiment ignites the air-fuel mixture for gentle combustion in the cylinder receiving the fuel injection in the compression stroke. The ignition in this cylinder may be performed after the top dead center TDC in the compression stroke. Further modification may not ignite the air-fuel mixture in the cylinder that has received the fuel injection but is later presumed to stop over the top dead center TDC in the compression stroke.

When the fuel injection cylinder, which has been expected to stop in the fuel injection stop range and has received the fuel injection, is later presumed to stop over the top dead center TDC in the compression stroke, the internal combustion engine system 20 of the embodiment injects the fuel in the next cylinder going into the compression stroke after the fuel injection cylinder, synchronously with ignition of the air-fuel mixture in the compression stroke of the fuel injection cylinder. The fuel injection into the next cylinder may be omitted as one possible modification.

In the internal combustion engine 20 of the embodiment, the engine 22 is provided with the fuel injection valves 32 to individually inject the fuel in the respective branches of the intake manifold 30 corresponding to the cylinders 22a to 22d. The engine 22 may alternatively be provided with fuel injection valves to inject the fuel in the respective combustion chambers 40 corresponding to the cylinders 22a to 22d.

In the internal combustion engine system 20 of the embodiment, the fuel injection stop range is set from the intake stroke to the compression stroke. The fuel injection storage range may alternatively be set within the compression stroke.

The embodiment and its modifications discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably adopted in manufacturing industries of internal combustion engine systems and in automobile manufacturing industries.

The invention claimed is:

1. A stop position prediction method that predicts a stop position of an internal combustion engine,
said stop position prediction method predicting the stop position of the internal combustion engine, based on measured rotation speed of the internal combustion engine when one of multiple cylinders of the internal combustion engine passes over a top dead center during a decrease in rotation speed of the internal combustion engine under prohibition of fuel injection into the internal combustion engine.

2. An internal combustion engine control method that controls an internal combustion engine, which comprises an air intake regulation unit that regulates an amount of intake air into the internal combustion engine; a fuel injection unit that is capable of individually injecting a supply of fuel into multiple cylinders of the internal combustion engine; an ignition unit that is capable of individually igniting an air-fuel mixture of the intake air and the injected fuel in the multiple cylinders of the internal combustion engine; and a crank angle measurement unit that measures a crank angle of the internal combustion engine, in response to a stop instruction of the internal combustion engine, said internal combustion engine control method predicting a stop position of the internal combustion engine and controlling the fuel injection unit and the air intake regulation unit according to the crank angle measured by the crank angle measurement unit to inject the fuel at a specific fuel injection timing immediately before a stop of the internal combustion engine into a specified cylinder, which stops in a preset cycle range including part of a compression stroke when the internal combustion engine stops at the predicted stop position and to increase the amount of intake air in the course of fuel injection at the specific fuel injection timing.

3. An internal combustion engine control method in accordance with claim 2, in response to a start instruction of the internal combustion engine, said internal combustion engine control method controlling the fuel injection unit and the ignition unit according to the crank angle measured by the crank angle measurement unit to ignite the air-fuel mixture at a first ignition timing in the specified cylinder, which stops in the preset cycle range, and to start the internal combustion engine.

4. An internal combustion engine control method that controls an internal combustion engine, which comprises an air intake regulation unit that regulates an amount of intake air into the internal combustion engine; a fuel injection unit that is capable of individually injecting a supply of fuel into multiple cylinders of the internal combustion engine; an ignition unit that is capable of individually igniting an air-fuel mixture of the intake air and the injected fuel in the multiple, cylinders of the internal combustion engine; and a crank angle measurement unit that measures a crank angle of the internal combustion engine, in response to a stop instruction of the internal combustion engine, said internal combustion engine control method predicting a stop position of the internal combustion engine and controlling the fuel injection unit according to the crank angle measured by the crank angle measurement unit to inject the fuel at a specific fuel injection timing immediately before a stop of the internal combustion engine into a specified cylinder, which stops in a preset cycle range including part of a compression stroke when the internal combustion engine stops at the predicted stop position and to inject another supply of the fuel before the stop of the internal combustion engine into the specified cylinder, which has received the fuel injection at the specific fuel injection timing.

5. An internal combustion engine control method in accordance with claim 4, in response to a start instruction of the internal combustion engine, said internal combustion engine control method controlling the fuel injection unit and the ignition unit according to the crank angle measured by the crank angle measurement unit to ignite the air-fuel mixture at a first ignition timing in the specified cylinder, which stops in the preset cycle range, and to start the internal combustion engine.

6. An internal combustion engine control method that controls an internal combustion engine, which comprises an air intake regulation unit that regulates an amount of intake air into the internal combustion engine; a fuel injection unit that is capable of individually injecting a supply of fuel into multiple cylinders of the internal combustion engine; an ignition unit that is capable of individually igniting an air-fuel mixture of the intake air and the injected fuel in the multiple cylinders of the internal combustion engine; and a crank angle measurement unit that measures a crank angle of the internal combustion engine, in response to a stop instruction of the internal combustion engine, said internal combustion engine control method predicting a stop position of the internal combustion engine and controlling the fuel injection unit according to the crank angle measured by the crank angle measurement unit to inject the fuel at a specific fuel injection timing immediately before a stop of the internal combustion engine into a specified cylinder, which stops in a preset cycle range including part of a compression stroke when the internal combustion engine stops at the predicted stop position, said internal combustion engine control method predicting the stop position of the internal combustion engine after the fuel injection at the specific fuel injection timing into the specified cylinder stopping in the preset cycle range, when the predicted stop position of the internal combustion engine leads to determination that a stop position of the specified cylinder receiving the fuel injection passes over an ignition-inducing stop position, said internal combustion engine control method controlling the ignition unit to ignite the air-fuel mixture in the specified cylinder before the stop position of the specified cylinder passes over the ignition-inducing stop position.

7. An internal combustion engine control method in accordance with claim 6, in response to a start instruction of the internal combustion engine, said internal combustion engine control method controlling the fuel injection unit and the ignition unit according to the crank angle measured by the crank angle measurement unit to ignite the air-fuel mixture at a first ignition timing in the specified cylinder, which stops in the preset cycle range, and to start the internal combustion engine.

8. An internal combustion engine system including an internal combustion engine, said internal combustion engine system comprising:

a rotation speed measurement unit that measures rotation speed of the internal combustion engine; and a stop position prediction module that predicts a stop position of the internal combustion engine, based on the rotation speed of the internal combustion engine measured by the rotation speed measurement unit when one of multiple cylinders of the internal combustion engine passes over a top dead center during a decrease in rotation speed of the internal combustion engine under prohibition of fuel injection into the internal combustion engine.

9. An internal combustion engine system in accordance with claim 8, wherein said stop position prediction module predicts the stop position of the internal combustion engine, based on a record of the rotation speed of the internal combustion engine measured by the rotation speed measurement unit when one of the multiple cylinders of the internal combustion engine passes over the top dead center.

10. An internal combustion engine system in accordance with claim 8, said internal combustion engine system further comprising:

an air intake regulation unit that regulates an amount of intake air into the internal combustion engine;

a fuel injection unit that is capable of individually injecting a supply of fuel into the multiple cylinders of the internal combustion engine;

an ignition unit that is capable of individually igniting an air-fuel mixture of the intake air and the injected fuel in the multiple cylinders of the internal combustion engine;

a crank angle measurement unit that measures a crank angle of the internal combustion engine;

a stop control module that, in response to a stop instruction of the internal combustion engine, controls the fuel injection unit according to the measured crank angle to inject the fuel at a specific fuel injection timing immediately before a stop of the internal combustion engine into a specified cylinder, which stops in a preset cycle range including part of a compression stroke when the internal combustion engine stops at the stop position predicted by said stop position prediction module; and a start control module that, in response to a start instruction of the internal combustion engine, controls the fuel injection unit and the ignition unit according to the measured crank angle to ignite the air-fuel mixture at a first ignition timing in the specified cylinder, which stops in the preset cycle range, and to start the internal combustion engine.

11. An internal combustion engine system in accordance with claim 10, wherein said stop control module controls the air intake regulation unit to increase the amount of intake air in the course of fuel injection at the specific fuel injection timing immediately before the stop of the internal combustion engine.

12. An internal combustion engine system in accordance with claim 10, wherein the fuel injection unit individually injects the supply of fuel into respective intake systems of the multiple cylinders of the internal combustion engine.

13. An internal combustion engine system in accordance with claim 12, wherein said stop control module controls the fuel injection unit according to the measured crank angle to inject the fuel into the specified cylinder, which stops in the preset cycle range, in an intake stroke of the specified cylinder immediately before the stop of the internal combustion engine.

14. An internal combustion engine system in accordance with claim 10, wherein when the stop position of the internal combustion engine, which is predicted by said stop position prediction module after the fuel injection at the specific fuel injection timing into the specified cylinder stopping in the preset cycle range, leads to determination that a stop position of the specified cylinder receiving the fuel injection passes over an ignition-inducing stop position, said stop control module controls the ignition unit to ignite the air-fuel mixture in the specified cylinder before the stop position of the specified cylinder passes over the ignition-inducing stop position.

15. An internal combustion engine system in accordance with claim 14, wherein in response to the determination that the stop position of the specified cylinder receiving the fuel injection passes over the ignition-inducing stop position, said stop control module controls the ignition unit to ignite the air-fuel mixture in a compression stroke of the specified cylinder.

16. An internal combustion engine system in accordance with claim 14, wherein the ignition-inducing stop position represents a top dead center in a compression stroke of the specified cylinder receiving the fuel injection.

17. An internal combustion engine system in accordance with claim 14, wherein in response to the determination that the stop position of the specified cylinder receiving the fuel injection passes over the ignition-inducing stop position, said stop control module controls the fuel injection unit to inject the fuel in an intake stroke of a next cylinder, which goes into a compression stroke after the specified cylinder, and said start control module controls the fuel injection unit and the ignition unit to ignite the air-fuel mixture at a first ignition timing in the next cylinder and to start the internal combustion engine.

18. An internal combustion engine system in accordance with claim 10, wherein said stop control module controls the fuel injection unit according to the measured crank angle to inject another supply of the fuel before the stop of the internal combustion engine into the specified cylinder, which has received the fuel injection at the specific fuel injection timing.

19. An internal combustion engine system in accordance with claim 18, wherein said stop control module controls the fuel injection unit according to the measured crank angle to inject a first amount of the fuel, which is less than a specific amount of the fuel to achieve a stoichiometric air-fuel ratio, into the specified cylinder stopping in the preset cycle range at the specific fuel injection timing immediately before the stop of the internal combustion engine, and to inject a corrected second amount of the fuel in the specified cylinder before the stop of the internal combustion engine.

20. An internal combustion engine system in accordance with claim 19, wherein the first amount of the fuel is determined to be not less than a minimum amount of the fuel as a combustible lean limit, and the second amount of the fuel is determined, such that a sum of the first amount and the second amount of the fuel achieves an air-fuel ratio sufficiently close to the stoichiometric air-fuel ratio.

21. An internal combustion engine system in accordance with claim 19, wherein when the stop position of the internal combustion engine, which is predicted by said stop position prediction module after the fuel injection at the specific fuel injection timing into the specified cylinder stopping in the preset cycle range, leads to determination that a stop position of the specified cylinder receiving the fuel injection does not pass over a reinjection-inducing stop position, said stop control module controls the fuel injection unit to inject the second amount of the fuel in an intake stroke of the specified cylinder.

22. An internal combustion engine system in accordance with claim 21, wherein the reinjection-inducing stop position is defined by a preset crank angle that causes a compression temperature in the specified cylinder receiving the fuel injection to rise to a temperature level with a potential for spontaneous ignition of the air-fuel mixture.

23. An internal combustion engine system in accordance with claim 21, wherein the reinjection-inducing stop position represents a top dead center in a compression stroke of the specified cylinder receiving the fuel injection.

24. An internal combustion engine system including an internal combustion engine, said internal combustion engine system comprising:

an air intake regulation unit that regulates an amount of intake air into the internal combustion engine;

a fuel injection unit that is capable of individually injecting a supply of fuel into respective intake systems of multiple cylinders of the internal combustion engine;

an ignition unit that is capable of individually igniting an air-fuel mixture of the intake air and the injected fuel in the multiple cylinders of the internal combustion engine;

a stop position prediction module that predicts a stop position of the internal combustion engine;

a crank angle measurement unit that measures a crank angle of the internal combustion engine;

a stop control module that, in response to a stop instruction of the internal combustion engine, controls the fuel injection unit and the air intake regulation unit according to the measured crank angle to inject the fuel at a specific fuel injection timing immediately before a stop of the internal combustion engine into a specified cylinder, which stops in a preset cycle range including part of a compression stroke when the internal combustion engine stops at the stop position predicted by said stop position prediction module and to increase the amount of intake air in the course of fuel injection at the specific fuel injection timing; and a start control module that, in response to a start instruction of the internal combustion engine, controls the fuel injection unit and the ignition unit according to the measured crank angle to ignite the air-fuel mixture at a first ignition timing in the specified cylinder, which stops in the preset cycle range, and to start the internal combustion engine.

25. An internal combustion engine system in accordance with claim 24, wherein when the stop position of the internal combustion engine, which is predicted by said stop position prediction module after the fuel injection at the specific fuel injection timing into the specified cylinder stopping in the preset cycle range, leads to determination that a stop position of the specified cylinder receiving the fuel injection passes over an ignition-inducing stop position, said stop control module controls the ignition unit to ignite the air-fuel mixture in the specified cylinder before the stop position of the specified cylinder passes over the ignition-inducing stop position.

26. An internal combustion engine system in accordance with claim 25, wherein in response to the determination that the stop position of the specified cylinder receiving the fuel injection passes over the ignition-inducing stop position, said stop control module controls the ignition unit to ignite the air-fuel mixture in a compression stroke of the specified cylinder.

27. An internal combustion engine system in accordance with claim 25, wherein the ignition-inducing stop position represents a top dead center in a compression stroke of the specified cylinder receiving the fuel injection.

28. An internal combustion engine system in accordance with claim 25, wherein in response to the determination that the stop position of the specified cylinder receiving the fuel injection passes over the ignition-inducing stop position, said stop control module controls the fuel injection unit to inject the fuel in an intake stroke of a next cylinder, which goes into a compression stroke after the specified cylinder, and said start control module controls the fuel injection unit and the ignition unit to ignite the air-fuel mixture at a first ignition timing in the next cylinder and to start the internal combustion engine.

29. An internal combustion engine system in accordance with claim 24, wherein said stop control module controls the fuel injection unit according to the measured crank angle to inject another supply of the fuel before the stop of the internal combustion engine into the specified cylinder, which has received the fuel injection at the specific fuel injection timing.

30. An internal combustion engine system in accordance with claim 29, wherein said stop control module controls the fuel injection unit according to the measured crank angle to inject a first amount of the fuel, which is less than a specific amount of the fuel to achieve a stoichiometric air-fuel ratio, into the specified cylinder stopping in the preset cycle range at the specific fuel injection timing immediately before the stop of the internal combustion engine, and to inject a corrected second amount of the fuel in the specified cylinder before the stop of the internal combustion engine.

31. An internal combustion engine system in accordance with claim 30, wherein the first amount of the fuel is determined to be not less than a minimum amount of the fuel as a combustible lean limit, and the second amount of the fuel is determined, such that a sum of the first amount and the second amount of the fuel achieves an air-fuel ratio sufficiently close to the stoichiometric air-fuel ratio.

32. An internal combustion engine system in accordance with claim 30, wherein when the stop position of the internal combustion engine, which is predicted by said stop position prediction module after the fuel injection at the specific fuel injection timing into the specified cylinder stopping in the preset cycle range, leads to determination that a stop position of the specified cylinder receiving the fuel injection does not pass over a reinjection-inducing stop position, said stop control module controls the fuel injection unit to inject the second amount of the fuel in an intake stroke of the specified cylinder.

33. An internal combustion engine system in accordance with claim 32, wherein the reinjection-inducing stop position is defined by a preset crank angle that causes a compression temperature in the specified cylinder receiving the fuel injection to rise to a temperature level with a potential for spontaneous ignition of the air-fuel mixture.

34. An internal combustion engine system in accordance with claim 32, wherein the reinjection-inducing stop position represents a top dead center in a compression stroke of the specified cylinder receiving the fuel injection.

35. An internal combustion engine system including an internal combustion engine, said internal combustion engine system comprising:

an air intake regulation unit that regulates an amount of intake air into the internal combustion engine;

a fuel injection unit that is capable of individually injecting a supply of fuel into multiple cylinders of the internal combustion engine;

an ignition unit that is capable of individually igniting an air-fuel mixture of the intake air and the injected fuel in the multiple cylinders of the internal combustion engine;

a stop position prediction module that predicts a stop position of the internal combustion engine;

a crank angle measurement unit that measures a crank angle of the internal combustion engine;

a stop control module that, in response to a stop instruction of the internal combustion engine, controls the fuel injection unit according to the measured crank angle to inject the fuel at a specific fuel injection timing immediately before a stop of the internal combustion engine into a specified cylinder, which stops in a preset cycle range including part of a compression stroke when the internal combustion engine stops at the stop position predicted by said stop position prediction module and to inject another supply of the fuel before the stop of the internal combustion engine into the specified cylinder, which has received the fuel injection at the specific fuel injection timing; and a start control module that, in response to a start instruction of the internal combustion engine, controls the fuel injection unit and the ignition unit according to the measured crank angle to ignite the air-fuel mixture at a first ignition timing in the specified cylinder, which stops in the preset cycle range, and to start the internal combustion engine.

36. An internal combustion engine system in accordance with claim 35, wherein the fuel injection unit individually injects the supply of fuel into respective intake systems of the multiple cylinders of the internal combustion engine, and said stop control module controls the fuel injection unit according to the measured crank angle to inject another supply of the fuel in an intake stroke of the specified cylinder, which stops in the preset cycle range, immediately before the stop of the internal combustion engine.

37. An internal combustion engine system in accordance with claim 35, wherein when the stop position of the internal combustion engine, which is predicted by said stop position prediction module after the fuel injection at the specific fuel injection timing into the specified cylinder stopping in the preset cycle range, leads to determination that a stop position of the specified cylinder receiving the fuel injection passes over an ignition-inducing stop position, said stop control module controls the ignition unit to ignite the air-fuel mixture in the specified cylinder before the stop position of the specified cylinder passes over the ignition-inducing stop position.

38. An internal combustion engine system in accordance with claim 37, wherein in response to the determination that the stop position of the specified cylinder receiving the fuel injection passes over the ignition-inducing stop position, said stop control module controls the ignition unit to ignite the air-fuel mixture in a compression stroke of the specified cylinder.

39. An internal combustion engine system in accordance with claim 37, wherein the ignition-inducing stop position represents a top dead center in a compression stroke of the specified cylinder receiving the fuel injection.

40. An internal combustion engine system in accordance with claim 37, wherein in response to the determination that the stop position of the specified cylinder receiving the fuel injection passes over the ignition-inducing stop position, said stop control module controls the fuel injection unit to inject the fuel in an intake stroke of a next cylinder, which goes into a compression stroke after the specified cylinder, and said start control module controls the fuel injection unit and the ignition unit to ignite the air-fuel mixture at a first ignition timing in the next cylinder and to start the internal combustion engine.

41. An internal combustion engine system in accordance with claim 35, wherein said stop control module controls the fuel injection unit according to the measured crank angle to inject a first amount of the fuel, which is less than a specific amount of the fuel to achieve a stoichiometric air-fuel ratio, into the specified cylinder stopping in the preset cycle range at the specific fuel injection timing immediately before the stop of the internal combustion engine, and to inject a corrected second amount of the fuel in the specified cylinder before the stop of the internal combustion engine.

42. An internal combustion engine system in accordance with claim 41, wherein the first amount of the fuel is determined to be not less than a minimum amount of the fuel as a combustible lean limit, and the second amount of the fuel is determined, such that a sum of the first amount and the second amount of the fuel achieves an air-fuel ratio sufficiently close to the stoichiometric air-fuel ratio.

43. An internal combustion engine system in accordance with claim 41, wherein when the stop position of the internal combustion engine, which is predicted by said stop position prediction module after the fuel injection at the specific fuel injection timing into the specified cylinder stopping in the preset cycle range, leads to determination that a stop position of the specified cylinder receiving the fuel injection does not pass over a reinjection-inducing stop position, said stop control module controls the fuel injection unit to inject the second amount of the fuel in an intake stroke of the specified cylinder.

44. An internal combustion engine system in accordance with claim 43, wherein the reinjection-inducing stop position is defined by a preset crank angle that causes a compression temperature in the specified cylinder receiving the fuel injection to rise to a temperature level with a potential for spontaneous ignition of the air-fuel mixture.

45. An internal combustion engine system in accordance with claim 43, wherein the reinjection-inducing stop position represents a top dead center in a compression stroke of the specified cylinder receiving the fuel injection.

46. An internal combustion engine system including an internal combustion engine, said internal combustion engine system comprising:

an air intake regulation unit that regulates an amount of intake air into the internal combustion engine;

a fuel injection unit that is capable of individually injecting a supply of fuel into multiple cylinders of the internal combustion engine;

an ignition unit that is capable of individually igniting an air-fuel mixture of the intake air and the injected fuel in the multiple cylinders of the internal combustion engine;

a stop position prediction module that predicts a stop position of the internal combustion engine;

a crank angle measurement unit that measures a crank angle of the internal combustion engine;

a stop control module that, in response to a stop instruction of the internal combustion engine, controls the fuel injection unit according to the measured crank angle to inject the fuel at a specific fuel injection timing immediately before a stop of the internal combustion engine into a specified cylinder, which stops in a preset cycle range including part of a compression stroke when the internal combustion engine stops at the stop position predicted by said stop position prediction module, when the stop position of the internal combustion engine, which is predicted by said stop position prediction module after the fuel injection at the specific fuel injection timing into the specified cylinder stopping in the preset cycle range, leads to determination that a stop position of the specified cylinder receiving the fuel injection passes over an ignition-inducing stop position, said stop control module controlling the ignition unit to ignite the air-fuel mixture in the specified cylinder before the stop position of the specified cylinder passes over the ignition-inducing stop position; and a start control module that, in response to a start instruction of the internal combustion engine, controls the fuel injection unit and the ignition unit according to the measured crank angle to ignite the air-fuel mixture at a first ignition timing in the specified cylinder, which stops in the preset cycle range, and to start the internal combustion engine.

47. An internal combustion engine system in accordance with claim 46, wherein the fuel injection unit individually injects the supply of fuel into respective intake systems of the multiple cylinders of the internal combustion engine.

48. An internal combustion engine system in accordance with claim 46, wherein in response to the determination that the stop position of the specified cylinder receiving the fuel injection passes over the ignition-inducing stop position, said stop control module controls the ignition unit to ignite the air-fuel mixture in a compression stroke of the specified cylinder.

49. An internal combustion engine system in accordance with claim 46, wherein the ignition-inducing stop position represents a top dead center in a compression stroke of the specified cylinder receiving the fuel injection.

50. An internal combustion engine system in accordance with claim 46, wherein in response to the determination that the stop position of the specified cylinder receiving the fuel injection passes over the ignition-inducing stop position, said stop control module controls the fuel injection unit to inject the fuel in an intake stroke of a next cylinder, which goes into a compression stroke after the specified cylinder, and said start control module controls the fuel injection unit and the ignition unit to ignite the air-fuel mixture at a first ignition timing in the next cylinder and to start the internal combustion engine.

* * * * *